US00RE49454E

(19) United States
(12) Reissued Patent
Knapp et al.

(10) Patent Number: US RE49,454 E
(45) Date of Reissued Patent: Mar. 7, 2023

(54) LIGHTING CONTROL SYSTEM

(71) Applicant: Lutron Technology Company LLC, Coopersburg, PA (US)

(72) Inventors: David J. Knapp, Austin, TX (US); Horace C. Ho, Austin, TX (US); Jason Lewis, Driftwood, TX (US)

(73) Assignee: Lutron Technology Company LLC, Coopersburg, PA (US)

(21) Appl. No.: 16/028,320

(22) Filed: Jul. 5, 2018

Related U.S. Patent Documents

Reissue of:
(64) Patent No.: 9,386,668
Issued: Jul. 5, 2016
Appl. No.: 14/573,207
Filed: Dec. 17, 2014

U.S. Applications:
(63) Continuation-in-part of application No. 13/231,077, filed on Sep. 13, 2011, now abandoned, and a
(Continued)

(51) Int. Cl.
*H05B 37/02* (2006.01)
*H04B 10/116* (2013.01)
(Continued)

(52) U.S. Cl.
CPC ..... *H05B 47/19* (2020.01); *H04B 10/116* (2013.01); *H04L 12/282* (2013.01);
(Continued)

(58) Field of Classification Search
CPC combination set(s) only.
See application file for complete search history.

(56) References Cited

U.S. PATENT DOCUMENTS 4,029,976 A 6/1977 Fish et al.
4,206,444 A 6/1980 Ferlan
(Continued)

FOREIGN PATENT DOCUMENTS

CN 1291282 4/2001
CN 1291282 A 4/2001
(Continued)

OTHER PUBLICATIONS

Office Action dated May 12, 2001 for U.S. Appl. No. 12/360,467.
(Continued)

*Primary Examiner* — Angela M Lie
(74) *Attorney, Agent, or Firm* — Condo Roccia Koptiw LLP

(57) ABSTRACT

Intelligent illumination device are disclosed that use components in an LED light to perform one or more of a wide variety of desirable lighting functions for very low cost. The LEDs that produce light can be periodically turned off momentarily, for example, for a duration that the human eye cannot perceive, in order for the light to receive commands optically. The optically transmitted commands can be sent to the light, for example, using a remove control device. The illumination device can use the LEDs that are currently off to receive the data and then configure the light accordingly, or to measure light. Such light can be ambient light for a photosensor function, or light from other LEDs in the illumination device to adjust the color mix.

50 Claims, 6 Drawing Sheets

Related U.S. Application Data continuation-in-part of application No. 12/924,628, filed on Sep. 30, 2010, now Pat. No. 8,674,913.

(51) Int. Cl.

| | |
|---|---|
| ***H04L 12/66*** | (2006.01) |
| ***H04L 12/64*** | (2006.01) |
| ***H04L 12/437*** | (2006.01) |
| ***H04L 12/40*** | (2006.01) |
| ***H04L 12/413*** | (2006.01) |
| ***H04L 12/28*** | (2006.01) |
| ***H05B 33/08*** | (2020.01) |
| ***H04L 12/43*** | (2006.01) |
| ***H05B 47/19*** | (2020.01) |
| ***H05B 45/00*** | (2022.01) |
| ***H05B 47/11*** | (2020.01) |
| ***H05B 47/18*** | (2020.01) |

(52) U.S. Cl.

CPC .. *H04L 12/40013* (2013.01); *H04L 12/40045* (2013.01); *H04L 12/413* (2013.01); *H04L 12/43* (2013.01); *H04L 12/437* (2013.01); *H04L 12/6418* (2013.01); *H04L 12/66* (2013.01); *H05B 45/00* (2020.01); *H05B 47/11* (2020.01); *H05B 47/18* (2020.01); *H04L 2012/285* (2013.01); *Y02B 20/40* (2013.01)

(56) References Cited

U.S. PATENT DOCUMENTS 4,402,090 A 8/1983 Gfeller et al.
4,713,841 A 12/1987 Porter et al.
4,745,402 A 5/1988 Auerbach
4,809,359 A 2/1989 Dockery
5,018,057 A 5/1991 Biggs et al.
5,093,744 A 3/1992 Sato et al.
5,103,466 A 4/1992 Bazes
5,181,015 A 1/1993 Marshall et al.
5,193,201 A * 3/1993 Tymes ..... H04B 10/807 398/171
5,218,356 A * 6/1993 Knapp ..... H04B 10/1149 342/350
5,299,046 A 3/1994 Spaeth et al. .... G06K 19/07749 257/679
5,317,441 A 5/1994 Sidman
5,383,044 A 1/1995 Borchardt
5,541,759 A 7/1996 Neff et al.
5,619,262 A 4/1997 Uno
5,657,145 A 8/1997 Smith
5,797,085 A 8/1998 Beuk et al.
5,905,445 A 5/1999 Gurney et al.
5,929,845 A 7/1999 Wei et al.
6,016,038 A 1/2000 Mueller et al.
6,067,595 A 5/2000 Lindenstruth
6,069,929 A 5/2000 Yabe et al.
6,084,231 A 7/2000 Popat
6,094,014 A 7/2000 Bucks et al.
6,094,340 A 7/2000 Min
6,108,114 A 8/2000 Gilliland et al.
6,127,783 A 10/2000 Pashley et al.
6,147,458 A 11/2000 Bucks et al.
6,150,774 A 11/2000 Mueller et al.
6,234,645 B1 5/2001 Borner et al.
6,234,648 B1 5/2001 Borner et al.
6,250,774 B1 6/2001 Begemann et al.
6,333,605 B1 * 12/2001 Grouev ..... H05B 37/0263 315/194
6,344,641 B1 2/2002 Blalock et al.
6,356,774 B1 3/2002 Bernstein et al.
6,359,712 B1 3/2002 Kamitani
6,384,545 B1 5/2002 Lau
6,396,815 B1 5/2002 Greaves et al.
6,414,661 B1 7/2002 Shen et al.
6,441,558 B1 8/2002 Muthu et al.
6,448,550 B1 9/2002 Nishimura
6,495,964 B1 12/2002 Muthu et al.
6,498,440 B2 12/2002 Stam et al.
6,513,949 B1 2/2003 Marshall et al.
6,577,512 B2 6/2003 Tripathi et al.
6,617,795 B2 9/2003 Bruning
6,636,003 B2 10/2003 Rahm et al.
6,639,574 B2 10/2003 Scheibe
6,664,744 B2 12/2003 Dietz
6,692,136 B2 2/2004 Marshall et al.
6,741,351 B2 5/2004 Marshall et al.
6,753,661 B2 6/2004 Muthu et al.
6,788,011 B2 9/2004 Mueller et al.
6,806,659 B1 10/2004 Mueller et al.
6,831,569 B2 12/2004 Wang et al.
6,831,626 B2 12/2004 Nakamura et al.
6,853,150 B2 2/2005 Clauberg et al.
6,879,263 B2 * 4/2005 Pederson ..... B60Q 1/2611 340/815.45
6,965,205 B2 11/2005 Piepgras et al.
6,969,954 B2 11/2005 Lys
6,975,079 B2 12/2005 Lys et al.
7,006,768 B1 * 2/2006 Franklin ..... H04B 10/1149 398/115
7,014,336 B1 3/2006 Ducharme et al.
7,038,399 B2 5/2006 Lys et al.
7,046,160 B2 5/2006 Pederson et al.
7,072,587 B2 * 7/2006 Dietz ..... G09G 3/3406 257/E31.096
7,088,031 B2 8/2006 Brantner et al.
7,119,500 B2 10/2006 Young
7,135,824 B2 11/2006 Lys et al.
7,161,311 B2 1/2007 Mueller et al.
7,166,966 B2 1/2007 Naugler, Jr. et al.
7,194,209 B1 3/2007 Robbins et al.
7,233,115 B2 6/2007 Lys
7,233,831 B2 6/2007 Blackwell
7,252,408 B2 8/2007 Mazzochette et al.
7,255,458 B2 8/2007 Ashdown
7,256,554 B2 8/2007 Lys
7,262,559 B2 8/2007 Tripathi et al.
7,294,816 B2 11/2007 Ng et al.
7,315,139 B1 1/2008 Selvan et al.
7,319,298 B2 1/2008 Jungwirth et al.
7,329,998 B2 2/2008 Jungwirth
7,330,002 B2 2/2008 Joung
7,330,662 B2 2/2008 Zimmerman
7,339,332 B2 3/2008 Cull et al.
7,352,972 B2 * 4/2008 Franklin ..... H04B 10/1141 398/127
7,358,706 B2 4/2008 Lys
7,359,640 B2 4/2008 Onde et al.
7,362,320 B2 4/2008 Payne et al.
7,372,859 B2 5/2008 Hall et al.
7,400,310 B2 7/2008 LeMay
7,445,340 B2 11/2008 Conner et al.
7,510,300 B2 3/2009 Iwauchi et al.
7,511,695 B2 3/2009 Furukawa et al.
7,525,611 B2 4/2009 Zagar et al.
7,553,033 B2 6/2009 Seki
7,554,514 B2 6/2009 Nozawa
7,573,210 B2 8/2009 Ashdown et al.
7,583,901 B2 9/2009 Nakagawa et al. ..... H04B 3/54 398/183
7,606,451 B2 10/2009 Morita
7,607,798 B2 10/2009 Panotopoulos
7,619,193 B2 11/2009 Deurenberg
7,649,527 B2 1/2010 Cho et al.
7,659,672 B2 2/2010 Yang
7,683,864 B2 3/2010 Lee et al.
7,701,151 B2 4/2010 Petrucci et al.
7,705,541 B2 4/2010 Watanabe et al.
7,737,936 B2 6/2010 Daly
7,828,479 B1 11/2010 Aslan et al.
7,878,488 B1 2/2011 Leason
7,885,548 B1 2/2011 Nelson
7,924,243 B2 4/2011 Kanai et al.
8,013,538 B2 9/2011 Zampini et al.

(56) References Cited

U.S. PATENT DOCUMENTS 8,018,135 B2 9/2011 Van De Ven et al.
8,035,603 B2 10/2011 Furukawa et al.
8,040,299 B2 10/2011 Kretz et al.
8,044,899 B2 10/2011 Ng et al.
8,044,918 B2 10/2011 Choi
8,057,072 B2 11/2011 Takenaka et al.
8,075,182 B2 12/2011 Dai et al.
8,076,869 B2 12/2011 Shatford et al.
8,159,150 B2 4/2012 Ashdown et al.
8,174,197 B2 5/2012 Ghanem et al.
8,174,205 B2 5/2012 Myers et al.
8,283,876 B2 10/2012 Ji
8,299,722 B2 10/2012 Melanson
8,362,707 B2 1/2013 Draper et al.
8,471,496 B2 6/2013 Knapp
8,503,886 B1 * 8/2013 Gunasekara ..... H04B 10/116 398/172
8,521,035 B2 8/2013 Knapp et al.
8,556,438 B2 10/2013 Mckenzie et al.
8,569,974 B2 10/2013 Chobot
8,595,748 B1 11/2013 Haggerty et al.
8,633,655 B2 1/2014 Kao et al.
8,653,758 B2 2/2014 Radermacher et al.
8,680,787 B2 3/2014 Veskovic
8,704,666 B2 4/2014 Baker, Jr.
8,721,115 B2 5/2014 Ing et al.
8,749,172 B2 6/2014 Knapp
8,773,032 B2 7/2014 May et al.
8,791,647 B2 7/2014 Kesterson et al.
8,816,600 B2 8/2014 Elder
8,886,045 B2 * 11/2014 Pederson ..... H05B 47/19 398/115
8,886,047 B2 11/2014 Knapp
8,911,160 B2 12/2014 Seo et al.
9,509,525 B2 11/2016 Knapp
9,848,482 B2 12/2017 Knapp
10,210,750 B2 2/2019 Knapp
10,847,026 B2 11/2020 Knapp et al.
2001/0020123 A1 9/2001 Diab et al.
2001/0030668 A1 10/2001 Erten et al.
2002/0014643 A1 2/2002 Kubo et al.
2002/0033981 A1 * 3/2002 Keller ..... H04B 10/1121 398/170
2002/0047624 A1 4/2002 Stam et al.
2002/0049933 A1 4/2002 Nyu
2002/0134908 A1 9/2002 Johnson
2002/0138850 A1 9/2002 Basil et al.
2002/0171608 A1 11/2002 Kanai et al.
2003/0103413 A1 6/2003 Jacobi, Jr. et al.
2003/0122749 A1 7/2003 Booth, Jr. et al. .... G06F 3/0412 345/82
2003/0133491 A1 7/2003 Shih
2003/0179721 A1 9/2003 Shurmantine et al.
2003/0234342 A1 12/2003 Gaines et al.
2004/0044709 A1 * 3/2004 Cabrera ..... H05B 47/105 708/191
2004/0052076 A1 3/2004 Mueller et al.
2004/0052299 A1 3/2004 Jay et al.
2004/0101312 A1 * 5/2004 Cabrera ..... H04B 10/116 398/172
2004/0136682 A1 7/2004 Watanabe
2004/0201793 A1 10/2004 Anandan et al.
2004/0208632 A1 10/2004 Dietz
2004/0220922 A1 11/2004 Lovison et al.
2004/0257311 A1 12/2004 Kanai et al.
2004/0263802 A1 12/2004 Seki et al.
2005/0004727 A1 1/2005 Remboski et al.
2005/0030203 A1 2/2005 Sharp et al.
2005/0030267 A1 2/2005 Tanghe et al.
2005/0053378 A1 3/2005 Stanchfield et al. ..... H04B 10/1143 398/115
2005/0077838 A1 4/2005 Blumel
2005/0110777 A1 5/2005 Geaghan et al.
2005/0117190 A1 6/2005 Iwauchi et al.
2005/0169643 A1 8/2005 Franklin ..... H04W 88/00 398/187
2005/0200292 A1 9/2005 Naugler, Jr. et al.
2005/0207157 A1 9/2005 Tani
2005/0242742 A1 11/2005 Cheang et al.
2005/0259439 A1 11/2005 Cull et al.
2005/0265731 A1 * 12/2005 Keum ..... H04B 10/114 398/183
2006/0012986 A1 1/2006 Mazzochette et al.
2006/0056855 A1 * 3/2006 Nakagawa ..... H05B 47/19 398/183
2006/0115386 A1 6/2006 Michaels et al.
2006/0145887 A1 7/2006 McMahon
2006/0164291 A1 7/2006 Gunnarsson
2006/0198463 A1 9/2006 Godin
2006/0220990 A1 10/2006 Coushaine et al.
2006/0227085 A1 10/2006 Boldt, Jr. et al.
2007/0007898 A1 1/2007 Bruning
2007/0040512 A1 2/2007 Jungwirth et al.
2007/0109239 A1 5/2007 den Boer et al.
2007/0132592 A1 6/2007 Stewart et al. ..... G06K 19/145 340/572.8
2007/0139957 A1 6/2007 Haim et al.
2007/0147843 A1 * 6/2007 Fujiwara ..... H04B 10/116 398/118
2007/0230322 A1 10/2007 Morita
2007/0248180 A1 10/2007 Bowman et al.
2007/0254694 A1 11/2007 Nakagwa et al.
2007/0279346 A1 12/2007 den Boer et al.
2007/0291197 A1 12/2007 Furukawa et al.
2008/0061717 A1 3/2008 Bogner et al.
2008/0067942 A1 3/2008 Watanabe et al.
2008/0107029 A1 5/2008 Hall et al.
2008/0120559 A1 5/2008 Yee
2008/0136334 A1 6/2008 Robinson et al. ..... H05B 47/18 315/151
2008/0136770 A1 6/2008 Peker et al.
2008/0136771 A1 6/2008 Chen et al.
2008/0150864 A1 6/2008 Bergquist
2008/0174530 A1 7/2008 Booth et al.
2008/0186898 A1 8/2008 Petite
2008/0222367 A1 9/2008 Co
2008/0235418 A1 9/2008 Werthen et al.
2008/0253766 A1 10/2008 Yu et al.
2008/0265799 A1 10/2008 Sibert
2008/0297066 A1 12/2008 Meijer et al.
2008/0297070 A1 12/2008 Kuenzler et al.
2008/0304833 A1 12/2008 Zheng ..... H04B 10/1143 398/135
2008/0309255 A1 12/2008 Myers et al.
2008/0317475 A1 * 12/2008 Pederson ..... H04W 4/025 398/135
2009/0026978 A1 1/2009 Robinson
2009/0040154 A1 2/2009 Scheibe
2009/0049295 A1 2/2009 Erickson et al.
2009/0051496 A1 2/2009 Pahlavan et al.
2009/0121238 A1 5/2009 Peck
2009/0171571 A1 7/2009 Son et al.
2009/0189776 A1 7/2009 Cheron et al.
2009/0196282 A1 8/2009 Fellman et al.
2009/0245101 A1 10/2009 Kwon et al.
2009/0278789 A1 11/2009 Declercq et al.
2009/0284511 A1 11/2009 Takasugi et al.
2009/0303972 A1 12/2009 Flammer, III et al.
2010/0005533 A1 1/2010 Shamir
2010/0052542 A1 3/2010 Siemiet et al.
2010/0054748 A1 3/2010 Sato
2010/0061734 A1 3/2010 Knapp
2010/0096447 A1 4/2010 Kwon et al.
2010/0117543 A1 5/2010 Van Der Veen et al.
2010/0134021 A1 6/2010 Ayres
2010/0134024 A1 6/2010 Brandes
2010/0141159 A1 6/2010 Shiu et al.
2010/0182294 A1 7/2010 Roshan et al.
2010/0188443 A1 7/2010 Lewis et al.
2010/0188972 A1 7/2010 Knapp
2010/0194299 A1 8/2010 Ye et al.

(56) References Cited

U.S. PATENT DOCUMENTS

| | | | | |
|---|---|---|---|---|
| 2010/0201274 | A1* | 8/2010 | Deixler | H05B 45/22 315/152 |
| 2010/0213856 | A1 | 8/2010 | Mizusako | |
| 2010/0272437 | A1 | 10/2010 | Yoon et al. | |
| 2010/0301777 | A1 | 12/2010 | Kraemer | |
| 2010/0327764 | A1 | 12/2010 | Knapp | |
| 2011/0031894 | A1 | 2/2011 | Van De Ven | |
| 2011/0044343 | A1 | 2/2011 | Sethuram et al. | |
| 2011/0052214 | A1 | 3/2011 | Shimada et al. | |
| 2011/0062874 | A1 | 3/2011 | Knapp | |
| 2011/0063214 | A1 | 3/2011 | Knapp | |
| 2011/0063268 | A1 | 3/2011 | Knapp | |
| 2011/0068699 | A1 | 3/2011 | Knapp | H04L 12/43 315/158 |
| 2011/0069094 | A1 | 3/2011 | Knapp | G09G 3/2003 345/690 |
| 2011/0069960 | A1 | 3/2011 | Knapp et al. | |
| 2011/0076024 | A1 | 3/2011 | Damink | |
| 2011/0133654 | A1 | 6/2011 | McKenzie et al. | |
| 2011/0148315 | A1 | 6/2011 | Van Der Veen et al. | |
| 2011/0150028 | A1 | 6/2011 | Nguyen et al. | |
| 2011/0248640 | A1 | 10/2011 | Welten | H05B 45/3575 315/210 |
| 2011/0253915 | A1 | 10/2011 | Knapp | |
| 2011/0299854 | A1 | 12/2011 | Jonsson et al. | H04B 10/116 398/106 |
| 2011/0309754 | A1 | 12/2011 | Ashdown et al. | |
| 2012/0001567 | A1* | 1/2012 | Knapp | H04L 12/6418 315/291 |
| 2012/0056545 | A1 | 3/2012 | Radermacher et al. | |
| 2012/0153839 | A1 | 6/2012 | Farley et al. | |
| 2012/0229032 | A1 | 9/2012 | Van De Ven et al. | |
| 2012/0299481 | A1 | 11/2012 | Stevens | |
| 2012/0306370 | A1 | 12/2012 | Van De Ven et al. | |
| 2013/0016978 | A1 | 1/2013 | Son et al. | |
| 2013/0088522 | A1 | 4/2013 | Gettemy et al. | |
| 2013/0201690 | A1 | 8/2013 | Vissenberg et al. | |
| 2013/0257314 | A1 | 10/2013 | Alvord et al. | |
| 2013/0293147 | A1 | 11/2013 | Rogers et al. | |
| 2013/0393147 | | 11/2013 | Rogers et al. | |
| 2014/0028377 | A1 | 1/2014 | Rosik et al. | |
| 2015/0022110 | A1 | 1/2015 | Sisto | |
| 2018/0233030 | A1* | 8/2018 | Knapp | H04L 12/282 |

FOREIGN PATENT DOCUMENTS

| | | | |
|---|---|---|---|
| CN | 1396616 | | 2/2003 |
| CN | 1396616 | A | 2/2003 |
| CN | 1573881 | | 2/2005 |
| CN | 1573881 | A | 2/2005 |
| CN | 1650673 | | 8/2005 |
| CN | 1650673 | A | 8/2005 |
| CN | 1849707 | | 10/2006 |
| CN | 1849707 | A | 10/2006 |
| CN | 101083866 | | 12/2007 |
| CN | 101083866 | A | 12/2007 |
| CN | 101150904 | | 3/2008 |
| CN | 101150904 | A | 3/2008 |
| CN | 101331798 | | 12/2008 |
| CN | 101331798 | A | 12/2008 |
| CN | 101458067 | | 6/2009 |
| CN | 101458067 | A | 6/2009 |
| EP | 0196347 | | 10/1986 |
| EP | 0196347 | A1 | 10/1986 |
| EP | 0456462 | | 11/1991 |
| EP | 0456462 | A2 | 11/1991 |
| EP | 2273851 | | 1/2011 |
| EP | 2273851 | A2 | 1/2011 |
| GB | 2307577 | | 5/1997 |
| GB | 2307577 | A | 5/1997 |
| JP | 06-302384 | | 10/1994 |
| JP | 06-302384 | A | 10/1994 |
| JP | 08-201472 | | 8/1996 |
| JP | 08-201472 | A | 8/1996 |
| JP | 11-025822 | | 1/1999 |
| JP | 11-025822 | A | 1/1999 |
| JP | 2000-286067 | A | 10/2000 |
| JP | 2001-514432 | | 9/2001 |
| JP | 2001-514432 | A | 9/2001 |
| JP | 2002-353900 | A | 12/2002 |
| JP | 2004-325643 | | 11/2004 |
| JP | 2004-325643 | A | 11/2004 |
| JP | 2005-539247 | | 12/2005 |
| JP | 2005-539247 | A | 12/2005 |
| JP | 2006-093450 | A | 4/2006 |
| JP | 2006-260927 | | 9/2006 |
| JP | 2006-260927 | A | 9/2006 |
| JP | 2007-047352 | A | 2/2007 |
| JP | 2007-266974 | | 10/2007 |
| JP | 2007-266974 | A | 10/2007 |
| JP | 2007-267037 | | 10/2007 |
| JP | 2007-267037 | A | 10/2007 |
| JP | 2008-500583 | A | 1/2008 |
| JP | 2008-507150 | | 3/2008 |
| JP | 2008-507150 | A | 3/2008 |
| JP | 2008-300152 | | 12/2008 |
| JP | 2008-300152 | A | 12/2008 |
| JP | 2009-134877 | | 6/2009 |
| JP | 2009-134877 | A | 6/2009 |
| JP | 2010-525567 | A | 7/2010 |
| KR | 1020080073172 | A | 8/2008 |
| KR | 1020080077353 | A | 8/2008 |
| WO | 99/10867 | A1 | 3/1999 |
| WO | 00/37904 | | 6/2000 |
| WO | 00/37904 | A1 | 6/2000 |
| WO | 03/075617 | | 9/2003 |
| WO | 03/075617 | A1 | 9/2003 |
| WO | 2005/024898 | | 3/2005 |
| WO | 2005/024898 | A2 | 3/2005 |
| WO | 2007/069149 | | 6/2007 |
| WO | 2007/069149 | A1 | 6/2007 |
| WO | 2008/065607 | | 6/2008 |
| WO | 2008/065607 | A2 | 6/2008 |
| WO | 2008/129453 | | 10/2008 |
| WO | 2008/129453 | A1 | 10/2008 |
| WO | 2008/152922 | A1 | 12/2008 |
| WO | 2010/124315 | | 11/2010 |
| WO | 2010/124315 | A1 | 11/2010 |
| WO | 2012/005771 | | 1/2012 |
| WO | 2012/005771 | A2 | 1/2012 |
| WO | 2012/042429 | | 4/2012 |
| WO | 2012/042429 | A2 | 4/2012 |
| WO | 2013/142437 | | 9/2013 |
| WO | 2013/142437 | A1 | 9/2013 |

OTHER PUBLICATIONS

Final Office Action dated Nov. 28, 2011 for U.S. Appl. No. 12/360,467.

Notice of Allowance dated Jan. 20, 2012 for U.S. Appl. No. 12/360,467.

Office Action dated Feb. 1, 2012 for U.S. Appl. No. 12/584,143.

Final Office Action dated Sep. 12, 2012 for U.S. Appl. No. 12/584,143.

Office Action dated Aug. 2, 2012 for U.S. Appl. No. 12/806,114.

Office Action dated Oct. 2, 2012 for U.S. Appl. No. 12/806,117.

Office Action dated Jul. 11, 2012 for U.S. Appl. No. 12/806,121.

Final Office Action dated Oct. 11, 2012 for U.S. Appl. No. 12/806,121.

Office Action dated Dec. 17, 2012 for U.S. Appl. No. 12/806,118.

Office Action dated Oct. 9, 2012 for U.S. Appl. No. 12/806,126.

Office Action dated Jul. 10, 2012 for U.S. Appl. No. 12/806,113.

Notice of Allowance dated Oct. 15, 2012 for U.S. Appl. No. 12/806,113.

Office Action dated Dec. 4, 2013 for U.S. Appl. No. 12/803,805.

Notice of Allowance dated Jan. 28, 2014 for U.S. Appl. No. 13/178,686.

Notice of Allowance dated Feb. 21, 2014 for U.S. Appl. No. 12/806,118.

Office Action dated Apr. 22, 2014 for U.S. Appl. No. 12/806,114.

Notice of Allowance dated Feb. 4, 2013 for U.S. Appl. No. 12/809,113.

(56) References Cited

OTHER PUBLICATIONS

Notice of Allowance dated Feb. 25, 2013 for U.S. Appl. No. 12/806,121.
Notice of Allowance dated May 3, 2013 for U.S. Appl. No. 12/806,126.
Office Action dated Jun. 10, 2013 for U.S, U.S. Appl. No. 12/924,628.
Office Action dated Jun. 27, 2013 for U.S. Appl. No. 13/178,686.
Final Office Action dated Jul. 9, 2013 for U.S. Appl. No. 12/806,118.
Final Office Action dated Jun. 14, 2013 for U.S. Appl. No. 12/806,117.
Office Action dated Oct. 24, 2013 for U.S. Appl. No. 12/806,117.
Notice of Allowance dated Oct. 31, 2013 for U.S. Appl. No. 12/924,628.
Office Action dated Nov. 12, 2013 for U.S. Appl. No. 13/231,077.
Final Office Action dated Jun. 18, 2014 for U.S. Appl. No. 13/231,077.
Office Action dated Jun. 23, 2014 for U.S. Appl. No. 12/806,117.
Notice of Allowance dated Aug. 21, 2014 for U.S. Appl. No. 12/584,143.
Office Action dated Sep. 10, 2014 for U.S. Appl. No. 12/803,805.
Office Action dated Mar. 25, 2015 for U.S. Appl. No. 14/305,472.
Notice of Allowance dated Mar. 30, 2015 for U.S. Appl. No. 14/097,355.
Office Action dated Apr. 8, 2015 for U.S. Appl. No. 14/305,456.
Notice of Allowance dated May 22, 2015 for U.S. Appl. No. 14/510,212.
Office Action dated May 27, 2015 for U.S. Appl. No. 12/806,117.
Final Office Action for U.S. Appl. No. 12/803,805 dated Jun. 23, 2015.
Office Action for U.S. Appl. No. 13/970,964 dated Jun. 29, 2015.
Office Action for U.S. Appl. No. 14/510,243 dated Jul. 28, 2015.
Office Action for U.S. Appl. No. 14/510,283 dated Jul. 29, 2015.
Office Action for U.S. Appl. No. 14/510,266 dated Jul. 31, 2015.
Office Action for U.S. Appl. No. 13/970,990 dated Aug. 20, 2015.
Final Office Action for U.S. Appl. No. 13/773,322 dated Sep. 2, 2015.
Notice of Allowance for U.S. Appl. No. 13/970,944 dated Sep. 11, 2015.
Notice of Allowance for U.S. Appl. No. 14/604,886 dated Sep. 25, 2015.
Notice of Allowance for U.S. Appl. No. 14/604,881 dated Oct. 9, 2015.
Notice of Allowance for U.S. Appl. No. 14/510,243 dated Nov. 6, 2015.
Notice of Allowance for U.S. Appl. No. 12/806,117 dated Nov. 18, 2015.
Office Action dated Mar. 6, 2015 for U.S. Appl. No. 13/733,322.
"International Preliminary Report on Patentability and Written Opinion", Int'l Application PCT/US2009/004953, dated Mar. 8, 2011, 5 pages.
"International Preliminary Report on Patentability", Int'l Application PCT/US2010/001919, dated Jan. 26, 2012, 7 pages.
"International Preliminary Report on Patentability", Int'l Application PCT/US2010/002171, dated Feb. 16, 2012, 6 pages.
"Search Report by Registered Search Organization", JP Application 2012-523605, dated Feb. 25, 2014, 15 pages.
"The Second Office Action", CN Application 2010-80032373.7, dated Apr. 15, 2014, 5 pages.
"Search Report by Registered Search Organization", JP Application 2012-520587, dated May 30, 2014, 10 pages.
"The First Office Action", CN Application 2010-80035731.X, dated Jun. 5, 2014, 5 pages.
"Notification to Grant Patent Right for Invention", CN Application 2010-80032373.7, dated Aug. 6, 2014, 2 pages.
"Notification to Grant Patent Right for Invention", CN Application 2010-80035731.X, dated Aug. 6, 2015, 2 pages.
"Decision to Grant a Patent", JP Application 2012-520587, dated Oct. 21, 2015, 2 pages.
"Notification of Reason for Refusal", KR Application 10-2012-7003792, dated Mar. 7, 2016, 7 pages.
"Notification of Reason for Refusal", KR Application 10-2012-7005884, dated Apr. 28, 2016, 3 pages.
"Notice of Final Rejection", KR Application 10-2012-7003792, dated Jun. 22, 2016, 1 page.
"Notice of Final Rejection", KR Application 10-2012-7005884, dated Jul. 20, 2016, 1 page.
"European Search Report and Search Opinion", EPC Application 10800143.9, dated Feb. 24, 2017, 10 pages.
"Supplementary Partial European Search Report", EPC Application 10806752.1, dated Mar. 8, 2017, 6 pages.
"European Search Report and European Search Opinion", EPC Application 10806752.1, dated Jun. 9, 2017, 12 pages.
Hall et al., "Jet Engine Control Using Ethernet with a BRAIN (Postprint)," AIAA/ASME/SAE/ASEE Joint Propulsion Conference Exhibition, Jul. 2008, pp. 1-18.
International Search Report & Written Opinion, PCT/US2010/004953, dated Mar. 22, 2010.
International Search Report & Written Opinion, PCT/US2010/000219, dated Oct. 12, 2010.
International Search Report & Written Opinion, PCT/US2010/002171, dated Nov. 24, 2010.
Bouchet et al., "Visible-light communication system enabling 73 Mb/s data streaming," IEE Globecom Workshop on Optical Wireless Communications, 2010, pp. 1042-1046.
International Search Report & Written Opinion, PCT/US2010/001919, dated Feb. 24, 2011.
International Search Report & Written Opinion, PCT/US2012/045392, dated Sep. 19, 2012.
Partial International Search Report, PCT/US2012/052774, dated Nov. 16, 2012.
International Search Report & Written Opinion, PCT/US2012/052774, dated Feb. 4, 2013.
International Search Report & Written Opinion, PCT/US2013/027157, dated May 16, 2013.
Office Action, CN Application No. 201080032373.7, dated Nov. 4, 2013.
Chonko, "Use Forward Voltage Drop to Measure Junction Temperature," (c) 2013 Penton Media, Inc., 5 pages.
Office Action, JP Application 2012-523605, dated Mar. 11, 2014.
Office Action, JP Application 2012-520587, dated Jul. 1, 2014.
Office Action, JP Application 2012-523605, dated Sep. 24, 2014.
Final Office Action, U.S. Appl. No. 12/806,117, dated Jan. 28, 2015.
Office Action, CN Application 201080035731.X, dated Feb. 2, 2015.
Office Action, JP Application 2012-520587, dated Feb. 17, 2015.
Partial International Search Report, PCT/US2014/068556, dated Mar. 27, 2015.
International Search Report & Written Opinion, PCT/US2014/068556, dated Jun. 22, 2015.
Partial International Search Report, PCT/US2015/037660, dated Aug. 21, 2015.
International Search Report & Written Opinion, PCT/US2015/037660, dated Oct. 28, 2015.
Partial International Search Report, PCT/US2015/045252, dated Nov. 18, 2015.
'Visible-light communication system enabling 73 Mb/s data streaming', Olivier Bouchet et al., IEEE Globecom 2010 Workshop on Optical Wireless Communications.*
Office Action mailed Mar. 11, 2014 for JP Application 2012-523605.
Office Action mailed Sep. 24, 2014 for JP Application 2012-523605.
Office Action mailed Mar. 25, 2015 for U.S. Appl. No. 14/305,472.
Notice of Allowance mailed Mar. 30, 2015 for U.S. Appl. No. 14/097,355.
Office Action mailed Apr. 8, 2015 for U.S. Appl. No. 14/305,456.
Notice of Allowance mailed May 22, 2015 for U.S. Appl. No. 14/510,212.
Office Action mailed May 27, 2015 for U.S. Appl. No. 12/806,117.
Partial International Search Report mailed Mar. 27, 2015 for PCT/US2014/068556.
"LED Fundamentals, How to Read a Datasheet (Part 2 of 2) Characteristic Curves, Dimensions and Packaging," Aug. 19, 2011, OSRAM Opto Semiconductors, 17 pages.
International Search Report & Written Opinion for PCT/US2014/068556 mailed Jun. 22, 2015.

(56) References Cited

OTHER PUBLICATIONS

Final Office Action for U.S. Appl. No. 12/803,805 mailed Jun. 23, 2015.
Office Action for U.S. Appl. No. 13/970,964 mailed Jun. 29, 2015.
Office Action for U.S. Appl. No. 14/510,243 mailed Jul. 28, 2015.
Office Action for U.S. Appl. No. 14/510,283 mailed Jul. 29, 2015.
Office Action for U.S. Appl. No. 14/510,266 mailed Jul. 31, 2015.
Final Office Action mailed Jan. 28, 2015 for U.S. Appl. No. 12/806,117.
Office Action mailed Mar. 6, 2015 for U.S. Appl. No. 13/773,322.
Office Action mailed Feb. 2, 2015 for CN Application 201080035731.X.
Office Action mailed Jul. 1, 2014 for JP Application 2012-520587.
Office Action mailed Feb. 17, 2015 for JP Application 2012-520587.
Kebemou, "A Partitioning-Centric Approach for the Modeling and the Methodical Design of Automotive Embedded System Architectures," Dissertation of Technical University of Berlin, 2008, 176 pages.
O'Brien et al., "Visible Light Communications and Other Developments in Optical Wireless," Wireless World Research Forum, 2006, 26 pages.
Zalewski et al., "Safety Issues in Avionics and Automotive Databuses," IFAC World Congress, Jul. 2005, 6 pages.
Visible Light Communication: Tutorial, Project IEEE P802.15 Working Group for Wireless Personal Area Networks (WPANs), Mar. 2008.
Johnson, "Visible Light Communications," CTC Tech Brief, Nov. 2009, 2 pages.
Office Action mailed May 12, 2011 for U.S. Appl. No. 12/360,467.
International Search Report & Written Opinion mailed Sep. 19, 2012 for PCT/US2012/045392.
Partial International Search Report mailed Nov. 16, 2012 for PCT/US2012/052774.
International Search Report & Written Opinion for PCT/US2012/052774 mailed Feb. 4, 2013.
Notice of Allowance mailed Feb. 4, 2013 for U.S. Appl. No. 12/806,113.
Notice of Allowance mailed Feb. 25, 2013 for U.S. Appl. No. 12/806,121.
Notice of Allowance mailed May 3, 2013 for U.S. Appl. No. 12/806,126.
International Search Report & Written Opinion, PCT/US2013/027157, May 16, 2013.
Office Action mailed Jun. 10, 2013 for U.S. Appl. No. 12/924,628.
Final Office Action mailed Jun. 14, 2013 for U.S. Appl. No. 12/806,117.
Office Action mailed Jun. 27, 2013 for U.S. Appl. No. 13/178,686.
Final Office Action mailed Jul. 9, 2013 for U.S. Appl. No. 12/806,118.
Office Action mailed Oct. 24, 2013 for U.S. Appl. No. 12/806,117.
Notice of Allowance mailed Oct. 31, 2013 for U.S. Appl. No. 12/924,628.
Office Action mailed Nov. 12, 2013 for U.S. Appl. No. 13/231,077.
Office Action mailed Nov. 4, 2013 for CN Application No. 201080032373.7.
"Color Management of a Red, Green, and Blue LED Combinational Light Source," Avago Technologies, Mar. 2010, pp. 1-8.
Notice of Allowance for U.S. Appl. No. 14/510,243 mailed Nov. 6, 2015.
Notice of Allowance for U.S. Appl. No. 12/806,117 mailed Nov. 18, 2015.
Partial International Search Report for PCT/US2015/045252 mailed Nov. 18, 2015.
International Search Report & Written Opinion mailed Oct. 28, 2015 for PCT/US2015/037660.
Office Action for U.S. Appl. No. 13/970,990 mailed Aug. 20, 2015.
Partial International Search Report for PCT/US2015/037660 mailed Aug. 21, 2015.
Final Office Action for U.S. Appl. No. 13/773,322 mailed Sep. 2, 2015.

* cited by examiner

LIGHTING CONTROL SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CONTINUING DATA

The present application is *a reissue of U.S. Pat. No. 9,386,668, issued on Jul. 5, 2016 from U.S. patent application Ser. No. 14/573,207, filed Dec. 17, 2014, which is hereby incorporated by reference herein in its entirety. U.S. Pat. No. 9,386,668 is* a continuation-in-part of U.S. patent application Ser. No. 13/231,077 filed Sep. 13, 2011 which is a continuation-in-part of U.S. patent application Ser. No. 12/924,628 filed Sep. 30, 2010 which claims priority to the following: (1) U.S. Provisional Patent Application No. 61/277,871 filed Sep. 30, 2009; (2) U.S. Provisional Patent Application No. 61/281,046 filed Nov. 12, 2009; (3) U.S. Provisional Patent Application No. 61/336,242 filed Jan. 19, 2010; (4) U.S. Provisional Patent Application No. 61/339,273 filed Mar. 2, 2010; which is further a continuation-in-part of U.S. patent application Ser. Nos. 12/806,114; 12/806,117; 12/806,121; 12/806,118; 12/806,126; 12/806,113, all filed Aug. 5, 2010, all of which claim priority to: (1) U.S. Provisional Patent Application No. 61/273,518 filed Aug. 5, 2009; (2) U.S. Provisional Patent Application No. 61/273,536 filed Aug. 5, 2009; (3) U.S. Provisional Patent Application No. 61/277,871 filed Sep. 30, 2009; (4) U.S. Provisional Patent Application No. 61/281,046 filed Nov. 12, 2009; (5) U.S. Provisional Patent Application No. 61/336,242 filed Jan. 19, 2010; (6) U.S. Provisional Patent Application No. 61/339,273 filed Mar. 2, 2010; all of which are further continuations-in-part of U.S. patent application Ser. No. 12/803,805 filed Jul. 7, 2010 which claims priority to: (1) U.S. Provisional Patent Application No. 61/224,904 filed Jul. 12, 2009; (2) U.S. Provisional Patent Application No. 61/273,518 filed Aug. 5, 2009; (3) U.S. Provisional Patent Application No. 61/273,536 filed Aug. 5, 2009; (4) U.S. Provisional Patent Application No. 61/277,871 filed Sep. 30, 2009; (5) U.S. Provisional Patent Application No. 61/281,046 filed Nov. 12, 2009; (6) U.S. Provisional Patent Application No. 61/336,242 filed Jan. 19, 2010; (7) U.S. Provisional Patent Application No. 61/339,273 filed Mar. 2, 2010; which further is a continuation-in-part of U.S. patent application Ser. No. 12/360,467 filed Jan. 27, 2009; and which further is a continuation-in-part of U.S. patent application Ser. No. 12/584,143 filed Sep. 1, 2009 which claims priority to U.S. Provisional Patent Application No. 61/094,595 filed Sep. 5, 2008.

BACKGROUND OF THE INVENTION

1. Field of the Invention

This invention relates to illumination devices and, more particularly, to controlling illumination devices.

2. Description of Related Art

A wide variety of lighting control systems are currently commercially available for controlling a variety of lighting features from simple on/off switching to complex color adjustment and performance monitoring. Such systems also communicate according to a wide variety of protocols over various communication channels. As an example, a simple system could be just a triac dimmer and a single lamp. As another example, a complex system could be a hierarchical campus wide network. In such a complex system, up to 64 intelligent fluorescent lamp ballasts within a room or group of rooms could be wired together using the Digital Addressable Lighting Interface (DALI) standard, for instance, with an Ethernet enabled DALI controller, which then communicates with other DALI controllers and a computer server over Ethernet within each building. At the top layer of the hierarchy, the computer servers in different buildings within a campus could communicate over the Internet using Internet Protocol (IP).

Some lighting control systems use protocols that are somewhat specific to lighting, such as 0-10V, DMX512, DALI, and Dynalite, while others use protocols that target building automation in general, such as X10, LonWorks, C-Bus, and ZigBee. Still other lighting control systems use industry standard networking protocols such as Ethernet, Wi-Fi, and HomePlug. At the campus wide level with communication over the Internet, such complex lighting control systems can also use telecom networking protocols such as SONET and ATM. All theses standards and protocols communicate at different rates, using different modulation and packetizing schemes, over various communication channels. Such channels include powerline for X10 and HomePlug, RF for ZigBee and Wi-Fi, optical fiber for SONET, and dedicated wires for most of the others including 2 wire DC for 0-10V, twisted pair for DALI and others, and CAT5 for Ethernet.

The 0-10V standard was one of the earliest and simplest lighting control signaling system, which is still supported by many fluorescent ballasts produced by companies such as GE, Philips, and Sylvania. Such ballasts produce light from an attached fluorescent lamp that is proportional to the DC voltage input to the ballast through two wires. Although simple to understand and implement, each ballast must have a dedicated cable to the system controller, which can become very expensive and cumbersome in large installations. Additionally, such a lighting control system can only control light level and cannot extract information from the ballast, such as if a bulb has burned out.

The DMX512 stands for "Digital Multiplex with 512 pieces of information" and is a standard for digital communication commonly used in theaters and production studios. DMX512 communicates over shielded twisted pair cable using EIA-485 standard voltages levels with node connected together in a daisy chain manner. Data is sent one byte per packet at 250 kbaud in a manner similar to RS232. The DMX512 protocol is popular for stage lighting due to the robustness of its cable and the relatively long communication distances.

The DALI standard, which is becoming relatively popular for commercial lighting systems, is similar to DMX512 in that various lamps can be individually controlled using a relatively low data rate digital control bus, however, there are many differences ranging from the type of communication cable and interconnections to data format and messaging requirements. While DMX512 communicates uni-directionally over shielded twisted pair cable between two nodes, DALI communicates bi-directionally over un-shielded twisted pair that can be tapped by up to 64 devices. While all DMX512 data frame comprise one start bit, 8 data bits, and two stop bits, DALI has different sized frames for communication in the different directions with both acknowledge and data bytes in one direction and no acknowledge in the other direction.

Unlike DALI, DMX512, 0-10v, and other protocols developed specifically for lighting, X10 was developed for general home automation of which lighting is an important subset. A further substantial difference is that X10 typically communicates data over the power lines that are already connected to most devices. X10 devices typically communicate one bit of information around each zero crossing of a 50 or 60 Hz AC mains cycle, by coupling bursts of a high frequency signal onto the powerline. As such, the data rate is very low. To compensate, the protocol is very simple in which all packets consist of an 8 bit address and a 4 bit command Since only 16 commands are possible, functionality is limited.

HomePlug is another protocol that uses the power line for communication, however, unlike X10, which was architected for home automation, HomePlug was designed to allow products communicate with each other and the Internet through existing home electrical wiring. A variety of versions of HomePlug have been released with data rates ranging from 10 to 200 Mbit/s. HomePlug achieves such data rates using adaptive modulation and complex error correction algorithms on over a thousand Orthogonal Frequency Division Multiplexed (OFDM) sub-carriers.

Data in a HomePlug network is typically communicated in Ethernet compatible packets, which comprise of a header with about 22 bytes, the payload with up to 1500 bytes, and a CRC code with 4 bytes, however, HomePlug also provides a variety of higher level services that provide, among other things, guaranteed delivery, fixed latency, quasi-error free service, and jitter control. As such, a HomePlug interface is much more complicated than is needed for simply lighting control.

Although communication over a power line is a good solution for some building networking applications, there are some drawbacks. For instance, there can be excessive attenuation between different phases of typically three phase systems, which can be overcome by active repeaters or sometimes with special capacitors. Additionally, signals can propagate through the power line between different buildings causing interference and security concerns. When appliances turn on and off significant noise is generated that can corrupt transmission. HomePlug physical layer interfaces have overcome some of such issues at the expense of complex analog and digital signal processing.

LonWorks is a building automation protocol that typically uses either twisted pair cable at 78 kbit/sec or the power line at a few kilobits per second for the communication channel. For communication over the power line, LonWorks uses dual carrier frequency operation in which messages are sent using one carrier frequency and, if a response is not received, the message is sent a second time using a second carrier frequency. More recent releases of the protocol allow IP data frames to be communicated across a LonWorks network, and a library of commands for a wide variety of appliances and functions have been and continue to be developed for a range of residential and commercial applications.

The C-Bus Protocol targets home automation systems as well as commercial lighting systems. Unlike the X10 protocol, C-Bus typically uses dedicated CAT5 cables and is considered by some to be more robust as a result. Ethernet also typically uses CAT5 cable for communicating between devices in a star topology with a router or switch at the center. Common data rates include 10, 100, and 1000 Mbit/sec, which are all deployed widely worldwide for computer networking. As mentioned previously, Ethernet data frames comprise a header of typically 22 bytes, a payload of up to 1500 bytes, and a CRC of four bytes. In many applications, the payload of an Ethernet frame is an Internet Protocol (IP) packet. Although overkill for simple lighting systems, Ethernet comprises the backbone of a variety of building lighting control networks, such as those from LumEnergi and others.

ZigBee comprises a group of high level communication protocols that typically use the IEEE 802.15.4-2003 standard for Wireless Personal Area Networks (WPANs) as the physical layer. As such, ZigBee typically uses small low power radios to communicate between appliances, light switches, consumer electronic, and other devices in a residence for instance. IEEE 802.15.4 uses either the 868 MHz, 915 MHz, or 2.4 GHz radio frequency bands. Data is direct-sequence spread spectrum coded and then Binary Phase Shift Key (BPSK) or Orthogonal Quadrature Phase Shift Key (OQPSK) modulated prior to transmission. Data is communicated in one of four different types of frames with variable data payload. Such frames include beacon frames, which specify a super-frame structure similar to that of HomePlug, data frames used for transfers of data, acknowledge frames used for confirming reception, and MAC command frame used for controlling the network. The SuperFrame structure allows certain devices guaranteed bandwidth and provides shared bandwidth for other devices. Many aspects of the network enable very low power communication with battery powered devices.

Wi-Fi or 802.11 is a very common wireless network for data communication between computers. A number of versions of the protocol including 802.11a, 802.11b, and 802.11g have been released over the years. The recent version, 802.11g, operates at the 2.4 GHz band and uses Orthogonal Frequency Division Multiplexing (OFDM) and typically achieves about 22 Mbit/sec average throughput. Similar to Ethernet, Wi-Fi frames comprise of a header, payload, and CRC. Similar to 802.15.4, Wi-Fi has a variety of different types of frames for communication management. In general, Internet Protocol (IP) and the associated Transport Control Protocol (TCP) run over Wi-Fi networks.

Although wireless protocols such as ZigBee and Wi-Fi do not need dedicated wires to communicate between devices, nor do they have the limitation previously mentioned associated with power line communication, such wireless networks can be limited by congestion in the increasingly crowded RF spectrum. Additionally, different countries in the world allocate spectrum differently which forces devices to sometimes operate in different frequency bands.

SUMMARY OF THE INVENTION

An alternative physical layer communication channel and associated network protocol for lighting control among other applications have been introduced that use modulated visible light traveling through free space to communicate data. According to such visible light communication (VLC) protocol, all devices synchronize to a frequency or phase of the AC mains for instance and produce gaps during which messages can be sent. At other times, lamps using LEDs or any other type of light source, simply produce illumination. During the gap times some number of bytes of data can be sent from one lamp to one or more other lamps that can comprise a complete message in itself, or such data can accumulate over any number of gaps to produce much larger messages.

Using visible light to communicate between lamps and other devices in a lighting system has many advantages over wired, wireless, and powerline communication networks such as those previously described. No dedicated wires are needed, which is important especially for installation in existing buildings. The visible light spectrum is unregulated globally and does not suffer from the congestion and interference common in RF wireless communication. Electrical noise on the powerline, from appliances turning on and off for instance, does not affect communication integrity as in powerline communication protocols. No expensive and complicated analog and digital signal processing is necessary to modulate and demodulate data as in many wireless and powerline protocols. The light source needed to transmit data is necessary anyway to provide illumination, and in the case that the light source is one or more LEDs, the LEDs can operate as the light detector as well. As such, the visible light communication protocol can be implemented in an LED lamp for virtually no additional cost.

A limitation of such a visible light communication protocol is that data cannot be communicated through walls between various rooms in a building. Another limitation is that, other than the remote controller, it is difficult to cost effectively control such a visible light communication network. The invention described herein, in various embodiments, provides solutions to overcome these limitations.

According to one embodiment, an electronic device is provided herein for controlling a lighting system. In certain exemplary embodiments, the electronic device is mounted to a wall in a room or held in a hand, for instance, and comprises a Human Machine Interface (HMI), such as a touch screen or a set of buttons (e.g., dedicated to specific lighting functions or programmable to perform a variety of functions) that are illuminated by a light source. In addition to illuminating the HMI, the light source also transmits messages through free space using visible light to one or more lamps in the room. For example, a HMI could comprise an LCD panel, which is illuminated by an LED backlight for displaying information about the controls or lighting system, and either an overlaid touch screen sensor or additional pushbuttons for entering information. Alternatively, the HMI could comprise just pushbuttons that are illuminated by some light source for use in the dark.

For a handheld electronic device (otherwise referred to herein as a wireless communication device), such as a smart phone or tablet computer, the display backlight could be modulated in a variety of ways including playing a video with alternating light and dark frames to produce light modulated with data. The ambient light sensor available on many handheld electronic devices could be used to receive data transmitted through free space using visible light. An alternative light source in many handheld electronic devices such as smart phones is the camera flash, which typically comprises one or more LEDs that can be modulated through software to transmit data through free space using visible light.

As another example, the light source in an electronic device that is mounted to a wall, for instance, can be synchronized to a frequency or phase of the AC mains, produce communication gaps that are synchronous to the communication gaps used by lamps in the room, and transmit data to the lamps in response to input from a user. Additionally, such an electronic device can have a light detector for receiving information from the lamps that is transmitted through free space using visible light. If the light source is one or more LEDs, then the LEDs can be both the light source and the light detector. In a further embodiment, the light produced by a light source in the electronic device is perceived as unchanging by a user independent of whether data is being transmitted or not. This is accomplished, for instance, by producing a small amount of light continuously when data is not being transmitted and by turning this small amount of light off before or after data is transmitted at high brightness for instance. In this exemplary embodiment, control circuitry within the electronic device is configured to produce commands in response to input directly from a user.

In certain exemplary embodiments, an electronic device comprising an HMI with a light source and a light detector also comprises circuitry to interface to any type of data communication network typically used for lighting or building control information. Such data communication network could communicate over dedicated wires (e.g., Ethernet, DALI, DMX512, and others), the power line (e.g., X10, HomePlug, and others), RF wireless (e.g., ZigBee, Wi-Fi, and others), or any other communication channel including for instance fiber optic cable and wireless infra-red. Such data communication network could interface for instance to a central building controller over Ethernet or DALI, or could interface for instance to a wireless communication device (such as a smartphone) over Wi-Fi, Bluetooth, IRDA, or any other data communication protocol supported by such wireless communication device. In some instances, the electronic device could comprise interfaces to multiple data communication networks, such as Ethernet and Wi-Fi, to support lighting control systems with mixed environments.

In an electronic device comprising an HMI that can communicate through free space using visible light, and interfaces to one or more data communication networks, control circuitry would receive input directly from the user through the HMI, data received from such data communication networks, or data received optically through free space. Such control circuitry in response to such input or data would produce commands encoded and transmitted according to a visible light communication protocol.

In certain exemplary embodiments, a lamp comprises a light source for illuminating an area and transmitting data through free space using visible light, a light detector for receiving data transmitted through free space using visible light, and an interface to one or more other types of data communication networks that carry lighting control information. If one or more LEDs can operate as the light source, then such LEDs could also be operable as both the light source and the light detector. The data communication network could communicate with the lamp over any type of communication channel and communication protocol. The lamp could be a lamp in a ceiling, for instance. In such a lamp, control circuitry receives input from one or more such data communication network or networks and produces commands encoded and transmitted according to a visible light communication protocol such as that described in the one or more priority applications listed herein.

DESCRIPTION OF THE DRAWINGS

The present invention may be better understood, and its numerous objects, features, and advantages made apparent to those skilled in the art by referencing the accompanying drawings.

Figure 1:
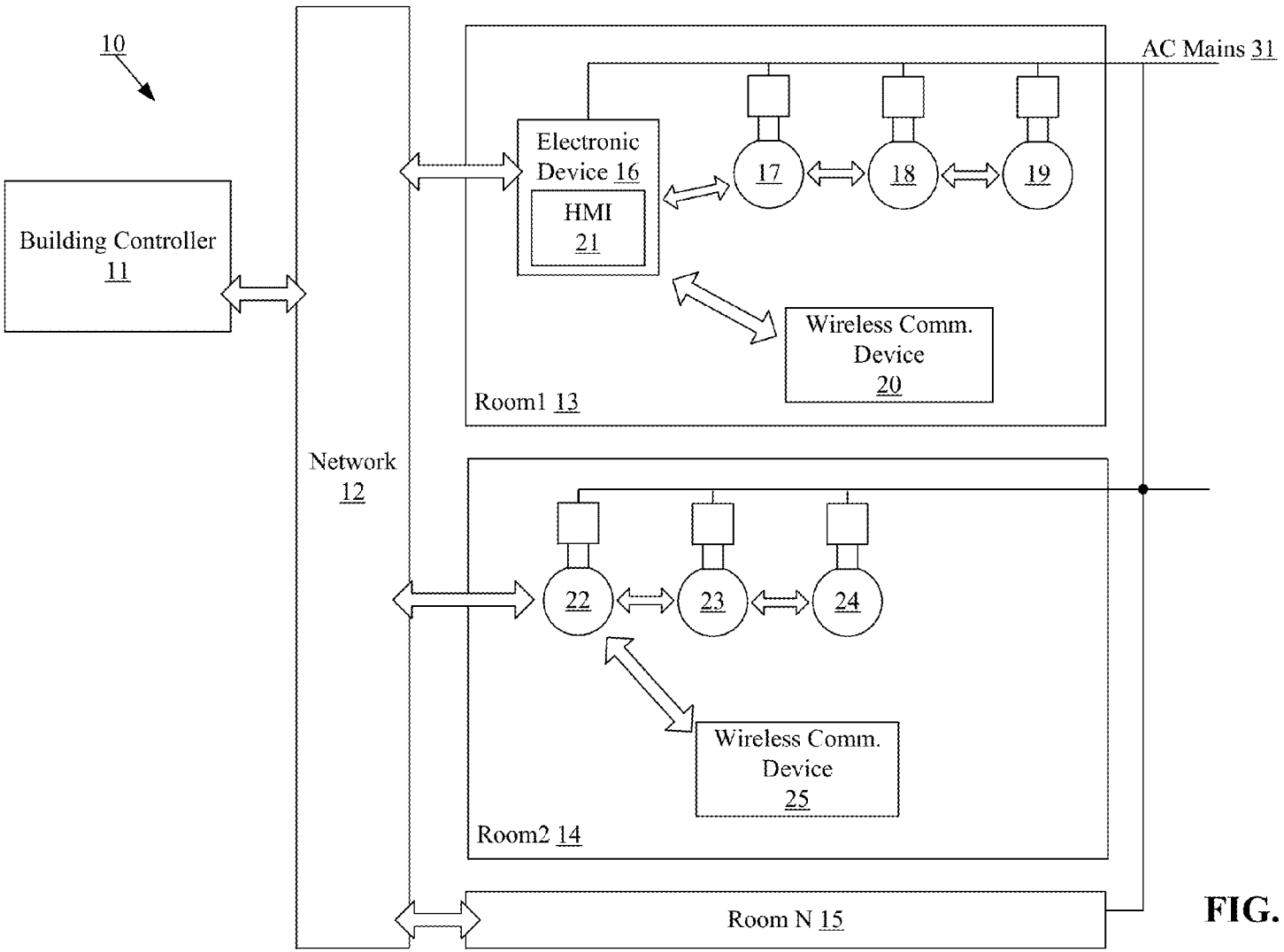
FIG. 1 is an exemplary block diagram of a lighting control system comprising a plurality of lamps, an electronic device and optional wireless communication device.

The use of the same reference symbols in different drawings indicates similar or identical items. While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to the drawings, FIG. 1 is one example of a building lighting system 10 that comprises building controller 11 configured for controlling the lighting system and a network 12 that connects room1 13, room2 14, and roomN 15 to building controller 11. The lighting system 10 shown in FIG. 1 further includes an electronic device 16, or possibly a lamp 22, which communicates with the network 12. The designation room1 through roomN represents any number of rooms in a building or even multiple buildings to one of more central controllers represented by building controller 11. Within any particular room, a plurality of lamps (e.g., lamps 17, 18, and 19 within room1, or lamps 22, 23 and 24 within room2) may communicate with each other and with an electronic device 16 through modulated visible light shown in FIG. 1 with bi-directional arrows.

In example room1 13, electronic device 16 interfaces between network 12, lamps 17, 18, and 19, and optionally wireless communication device 20. Wireless communication device 20 may or may not be part of building lighting system 10, but if included, can be any type of mobile device including but not limited to mobile phones, smart phones, personal digital assistants (PDA), and mobile computers such as netbooks, notebooks, and laptops. Wireless communication device 20 could also be a stationary device, such as a desktop computer. In some embodiments, wireless communication device 20 may communicate with electronic device 16 using any radio or infra-red frequency wireless communication protocol including, but not limited to, Zigbee, Wi-Fi, and Bluetooth. In some embodiments, wireless communication device 20 may be configured for controlling the lighting system, similar to electronic device 16, and may be considered to be a hand held electronic device.

Network 12 typically might communicate according to the wired DALI or Ethernet standards, or the wireless ZigBee or Wi-Fi standards, but could communicate according to any data communication protocol using wired, wireless, powerline, fiber optic, or any other type of communication channels. Network 12 and optional wireless communication device 20 can communicate according to the same or different wireless protocols, or can communicate over different protocols using different wired or wireless communication channels.

Electronic device 16 represents any electronic device that provides an interface between lamps 17, 18 and 19 and network 12, and that also provides a human machine interface (HMI) 21. HMI 21 is configured to receive input from a user, which is typically used, but not limited to, local control of lamps 17, 18, and 19 in room1 13, for instance. In one embodiment, electronic device 16 could be a device mounted on a wall within room1 13 that enables a user to control the lighting within room1 13 independent of and/or overriding commands from building controller 11. Electronic device 16 could be a device about the size of a conventional light switch or a ganged light switch. In one example, electronic device 16 could be implemented with an HMI 21, such as a display and touch screen that enables a user to select lighting functions from a menu or nested menus for instance. Electronic device 16 also, for instance, could be implemented with an HMI 21, such as a set of buttons that are dedicated to particular functions, such as on/off, dimming, color, timing, and other functions such as those described in the one or more priority application listed herein.

In the example lighting system of FIG. 1, electronic device 16 communicates with lamps 17, 18, and 19 through modulated visible light. According to one embodiment, electronic device 16 could comprise a dedicated light source, which is configured to provide illumination and to transmit data optically through free space using visible light, and optionally an additional light detector, which is configured to receive data transmitted optically through free space using visible light. According to another embodiment, the dedicated light source may be used to both illuminate the HMI 21 and to communicate modulated visible light uni-directionally or bi-directionally with lamps 17, 18, and 19 in the example room1 13 of FIG. 1.

In order for the HMI 21 to be visible in the dark, for instance, the electronic device typically comprises a backlight (or a light source positioned behind the HMI) that illuminates the HMI (e.g., various push buttons or an LCD display with an overlaid touch screen sensor) from behind. Many possible HMIs are possible with the commonality that a light source is typically necessary for a user to see in at least a dark environment. Such a light source typically will be an LED or array of LEDs, but could comprise any type of light source including, for instance, Cold Cathode Fluorescent lamps (CCFL). If the light source is a CCFL or, for instance, a white LED with a phosphor coating, preferentially the electronic device also comprises an additional photo-detector.

According to one embodiment of the invention, the light emitted from the backlight of the HMI is modulated in such a way that one or more of lamps 17, 18, and 19 can detect the data represented by such modulation. In some embodiments, electronic device 16 can also receive data sent by lamps 17, 18, or 19, e.g., through the additional photo-detector, or through the backlight. For example, if the backlight comprises one or more LEDs for illumination and data transmission, and preferentially mono-chromatic LEDs such as red, green, and blue, the LEDs used for illumination and data transmission may also be used to receive data sent by lamps 17, 18, or 19.

According to another embodiment of the invention, wireless communication device 20, which could be any type of computing device with a backlit display such as a smart phone, PDA, or a tablet, netbook, notebook, or desktop computer, may communicate directly with electronic device 16 or with lamps 17, 18, and 19 through free space using visible light. For example, wireless communication device 20 may produce commands in response to input received directly from a user, and may transmit such commands to the electronic device 16 or directly to the lamps 17, 18 and 19 using visible light. As with electronic device 16, the backlight for the display of the wireless communication device 20 can be modulated to transmit data or commands optically to the electronic device 16 or directly to lamps 17, 18, and 19. This can be accomplished in various ways including, but not limited to, playing a video with alternating light and dark frames producing the transmitted data. The ambient light sensor available on many wireless communication devices can also be used as a light sensor to receive data. Alternatively, the camera flash, which typically comprises one or more LEDs on a smart phone, for instance, can also be modulated through software to transmit data to electronic device 16 or to lamps 17, 18, and 19 in the example of FIG. 1.

According to another embodiment, a lamp may be used to interface with the network 12 instead of an electronic device. As represented by room2 14, for instance, lamp 22 provides an interface between the lamps 22, 23, and 24 within room2 14 and network 12. As such, lamp 22 comprises a network interface, which is capable of communicating with network 12 according to any protocol using any communication channel including, but not limited to, RF wireless, wired, fiber optic, or power line. In this example room2 14, lamp 22 further comprises a light source for illumination and data transmission, and a light detector for receiving data from lamps 23 and 24. In one embodiment of the invention, if the light source is one or more LEDs, then such LEDs can also operate as the light detector depending on when data is to be sent or received.

As in example room1 13 and wireless communication device 20, wireless communication device 25 in room2 14, for instance, can locally control lamps 22, 23, and 24 by overriding commands from building controller 11 or can implement any functionality supported by lighting system 10. In this example room2 14, wireless communication device 25 communicates with lamp 22, which also provides the interface to network 12. As such, according to one embodiment of the invention, lamp 22 further comprises a wireless interface compatible with wireless (RF, infra-red, etc) communication device 25 and an interface compatible with network 12.

Within the example room1 13 and room2 14, lamps 17, 18, and 19, and lamps 22, 23, and 24 respectively communicate between each other using modulated visible light. When observed by the human eye, although the light is visible, the modulation of the light is typically not discernable and is typically perceived as constant and unchanging light. The maximum distance between any two lamps, for instance lamps 17 and 18, is determined by the brightness and directionality of the data transmitting lamp and the light detection sensitivity of the data receiving lamp. In the example room1 13, lamps 17 and 18 are positioned within such maximum communication distance, and lamps 17 and 19 for instance are positioned beyond such maximum communication distance. According to another embodiment of the invention, lamp 18 in the example room1 13 relays messages sent through modulated visible light between lamps 17 and 19 to enable communication between large numbers of lamps that are large distances apart.

According to the invention, lamps that relay commands first receive data on a light detector and forward such input to control circuitry that regenerates commands in response to such input. For instance, commands can be directed from lamp 17 to lamp 19 only, while lamp 18 simply receives and retransmits such commands along a dedicated path as in the Internet. Alternatively, messages from an example lamp 17 can be broadcast to all lamps in which lamp 18 for instance responds to such broadcast command and also retransmits such command to lamp 19 for instance. As such, commands can be sent through a network of lamps as broadcast messages or through dedicated or ad-hoc paths between particular lamps or groups of lamps. Ad-hoc paths are well known to those practicing in the field of mesh networking, which is commonly used in Zigbee wireless networks for instance.

FIG. 1 is just one example of many possible lighting control systems 10, which could comprise any number of buildings, rooms within each building, and lamps within each room, hallway, entryway, etc. Additionally, lighting control system 10 may comprise of any number of building controllers and any type or multi-types of networks between rooms. The networks 12 between rooms can communicate according to any type of protocol including standards such as Ethernet, DALI, Wi-Fi, and others that use wired, RF, power line, fiber optic, or any other type of data communication channel.

The embodiments of the invention illustrated by this example FIG. 1 include, but are not limited to, the following devices:

a. electronic device 16 that produces commands in response to input received directly from a user through an HMI 21, from a lighting control network 12, or from a wireless communication device 20, and transmits such commands using the same light source that is used to illuminate the HMI 21 of the electronic device 16;
b. wireless communication device 20 that produces commands in response to input directly from a user and transmits such commands to the electronic device 16 or directly to the lamps 17, 18 or 19 using the backlight or the flash of the wireless communication device 20;
c. lamp 22 that produces commands in response to input received from a lighting control network 12 or a wireless communication device 25 and transmits such commands to lamps 23 and 24 using the same light source that is used for illumination;
d. lamp 17 that produces commands in response to input received from another lamp 18 or 19 or an electronic device 16 and detected by the light sensor, and transmits such commands using the same light source that is used for illumination.

Preferentially, lamps 17, 18, 19, 22, 23, and 24 and optionally electronic device 16 communicate between each other in synchronization with the AC mains 31, as described in one or more priority applications listed herein; however, such devices could communicate according to any communication protocol that uses visible light traveling through free space. Such communication can be between devices that are in or out of synchronization and according to any modulation technique, data rate, or distance. Likewise, any routing or mesh networking protocol can be implemented using such devices that receive and retransmit commands optically through free space. As noted herein, the term "free space" refers to communication within space, but not confined to, for example, an optical fiber. Thus, transfer of commands occurs optically, but not constrained within an optical fiber or any other type of waveguide device, yet is free and able to travel optically in any non-obstructed direction. The example of a building lighting system 10 does not limit the embodiment to a single building, but can be among several buildings or within a portion of the building. Moreover, each room shown in the lighting system 10 is configured according to one example if, for example, there are several rooms controlled by a lighting system. If the system controls only a single room, then the example in FIG. 1 would apply to different sub-regions within that room, each having a different interface to a network. Likewise, each room or sub-regions of a room can be controlled according to that shown in room1 13, room2 14, or both.

Thus, the lighting system can be controlled with an electronic device 16 that comprises a HMI 21 and provides an interface between lamps 17, 18, 19 and network 12. Alternatively, the lighting system can be controlled with a wireless communication device, e.g., device 25, and interface to the network 12 can be achieved solely with a light source (e.g., lamp 22), which can also function as a light detector. In this case, the HMI can be achieved by a wireless communication device (e.g., device 25) that need not be configured between the lamps 22, 23, and 24 and the network 12.

Accordingly, an electronic device is provided herein having both a light source and a light detector, as well as control circuitry, which is configured to produce commands for controlling the lighting system in response to received input and/or data. The electronic device can further comprise an HMI configured to receive input from a user, and/or a network interface configured to receive data from a network, depending on the configuration shown in the examples of FIG. 1. Various embodiments of lamps are also provided herein having a light source, a light detector and control circuitry that produces commands transmitted by the light source in response to commands received through the light detector. In some embodiments, a lamp may be configured to produce commands in response to input received from a network 12 or a wireless communication device 25 and to transmit such commands to other lamps using the same light source that is used for illumination.

Figure 2:
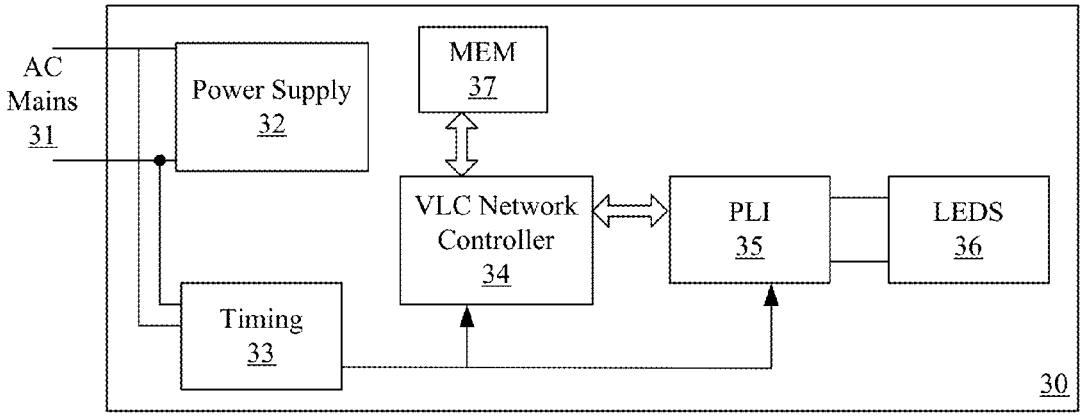
FIG. 2 is an exemplary block diagram of a lamp that communicates with an electronic device and/or other lamps through free space using visible light.

FIG. 2 is one example of a block diagram of a lamp 30 comprising a light source that is configured to provide illumination and transmit data optically through free space, a light detector that is configured to receive data transmitted optically through free space, and a control circuit that produces commands transmitted by the light source in response to commands received through the light detector. According to one embodiment, LEDs 36 may be configured at different times as both the light source and the light detector. Example lamps 17, 18, 19, 23 or 24 could comprise the circuitry represented by this example FIG. 2. As such, in addition to providing general illumination, a lamp comprising such control circuitry can receive messages sent via modulated visible light (e.g., from electronic device 16, wireless communication device 20 or 25, or another lamp) and can retransmit such information according to any predetermined fixed routing or any ad-hoc mesh networking protocols for instance.

As shown in FIG. 2, lamp 30 connects to the AC mains 31 that provides power and synchronization in this example. Power supply 32 converts AC power to DC power that provides current to LEDs 36 and voltage to the remaining circuitry in lamp 30. Timing 33 typically comprises a phase locked loop (PLL) that locks to the AC mains 31 frequency and/or phase, and provides timing information to visible light communication (VLC) network controller 34 and physical layer interface (PLI) 35. Since the example electronic device 16 and lamps 17, 18, 19, 22, 23, and 24 (FIG. 1) are all coupled and thus synchronized to the same AC mains 31, the timing of the VLC network controllers 34 and PLIs 35 in all such example devices is substantially the same, which simplifies data communication as described in one or more priority applications listed herein.

PLI 35 typically comprises an LED driver circuit (not shown) that produces a substantially DC current to produce illumination from LEDs 36 and modulated current to transmit data from LEDs 36. Such substantially AC and DC currents can be combined in many different ways to produce both illumination and transmit data using the same light source. Periodic time slots can be produced in synchronization with the AC mains 31 during which the example DC current is turned off and the example AC current is turned on during gaps in which data is transmitted.

PLI 35 also typically comprises a receiver circuit (not shown) that in this example FIG. 2 detects photo-current induced in LEDs 36 while receiving data transmitted using visible light through free space. Such receiver typically converts such photo-current to voltage, which is then compared to a reference voltage to determine a sequence of ones and zeros sent by the transmitting device. The details of one example PLI 35 are described in one or more priority applications listed herein.

VLC network controller 34 interfaces with PLI 35 and memory 37 to receive commands transmitted using visible light through free space, to implement the necessary control circuit functionality of lamp 30, and in some cases, re-transmit commands using LEDs 36 that were previously received by LEDs 36 during gap times. Commands received by the light detector, in this case LEDs 36, can be stored in memory 37 and further processed. Commands that target lamp 30 can be interpreted by VLC network controller 34 and processed locally. For instance, the brightness or color of LEDs 36 can be adjusted by adjusting the substantially DC current applied to LEDs 36 by the driver function within PLI 35. Commands that target other or additional lamps can be stored in memory 37 and re-transmitted by PLI 35 and LEDs 36 during subsequent gap times for instance. Such commands can be routed through a pre-determined path, through an ad-hoc mesh network, or broadcast to all electronic devices for instance. VLC network controller 34 may be configured to communicate such commands according to a visible light communication protocol.

In this example FIG. 2, timing 33 can not only synchronize all electronic devices and lamps 30 in the network, but can also provide timing to power supply 32 to minimize noise coupling into PLI 35. As such, FIG. 2 is just one example of many possible lamps 30 that receive commands communicated through free space using a light detector and re-transmit such commands to other electronic devices or lamps using visible light. The preferential visible light communication protocol is described in one or more priority applications listed herein, however, any visible light communication protocol and multiplexing scheme between illumination and data communication are possible. Additionally, lamp 30 could have a variety of block diagrams different from this example FIG. 2. For instance, lamp 30 could be DC or solar powered for instance. Likewise, any type of light source is possible including, but not limited to, fluorescent tubes, compact fluorescent lights, incandescent light, etc. In particular, lamp 30 could comprise a light detector, such as a silicon photo-diode in addition to the light source, which in this example FIG. 2 is LEDs 36.

Figure 3:
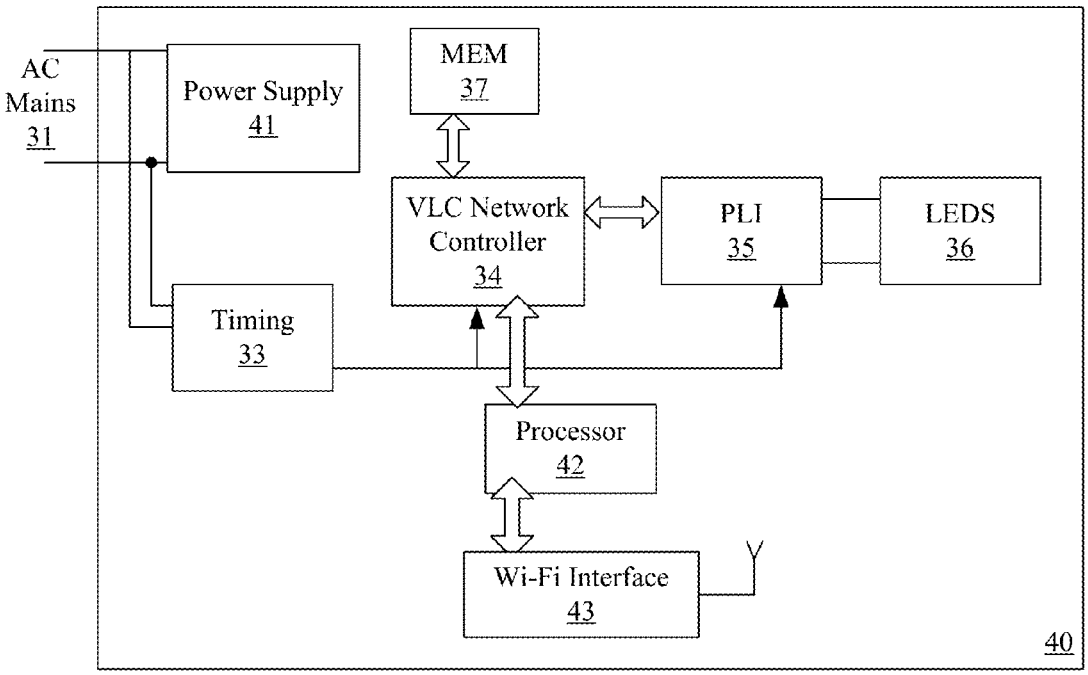
FIG. 3 is an exemplary block diagram of a lamp that communicates with other lamps through free space using visible light and with a network and other controlling devices through a Wi-Fi interface.

FIG. 3 is one example block diagram of a lamp 40 (e.g., lamp 22 in FIG. 1) that can transmit and receive data communicated using visible light through free space, and can also communicate according to the wireless 802.11 protocol with building controller 11 and wireless communication devices 20 and 25. As in lamp 30, lamp 40 comprises LEDs 36, PLI 35, VLC Network Controller 34, memory 37, and timing 33. Power supply 41 may be slightly different from power supply 32 due to the additional load provided by the additional processor 42 and Wi-Fi interface 43.

In this example lamp 40, LEDs 36 operate as both the light source and the light detector for transmitting and receiving data using visible light communicated through free space. LEDs 36 also provide illumination. Wireless 802.11 interface 43 can receive messages from wireless communication devices (e.g., a smart phone) 20 and 25, or from building controller 11, and can forward such messages to processor 42, which can implement the control circuitry functionality necessary to interpret or translate such messages to commands that can be transmitted through free space using visible light (e.g., using LEDs 36 as the light source). Likewise, commands transmitted optically through free space can be received by LEDs 36 operating as light detectors, interpreted or translated by processor 42, and transmitted by Wi-Fi interface 43 back to wireless communication devices 20 and 25 or building controller 11.

Whether or not a lamp includes a processor and separate Wi-Fi interface, as shown in FIG. 3, it is appreciated that the lamp operates as a light source and a light detector via one or more LEDs to which it controls. When a separate processor and Wi-Fi interface are not included, as in the embodiment of FIG. 2, the VLC network 34 of the lamp 30 provides the control circuitry through the PLI 35 to the light source and light detector dual purpose function of the LEDs 36. The controllable LEDs can control other LEDs within optical range, both within a bank of LEDs 36 or external to the bank of LEDs as shown by the bi-directional arrows of FIGS. 2 and 3.

Figure 4:
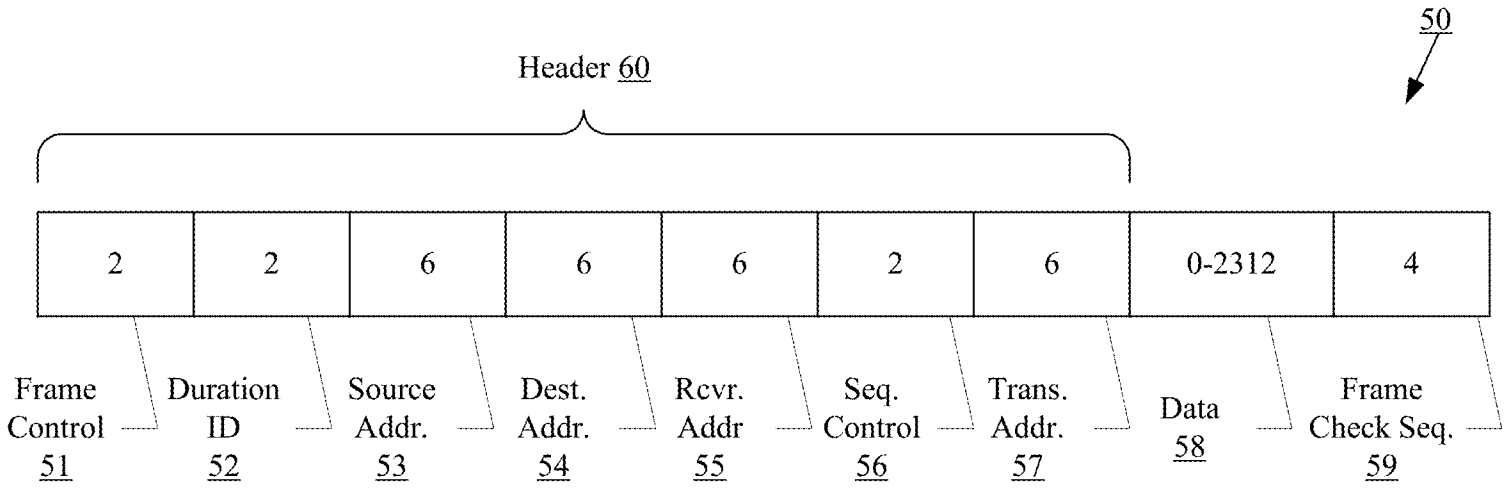
FIG. 4 is an exemplary diagram for the structure of a Wi-Fi data communication packet.

FIG. 4 illustrates the typical data frame format 50 for Wi-Fi, which comprises up to thirty bytes for header 60, zero to two thousand three hundred twelve (2312) bytes for data 58, and four bytes for frame check sequence (FCS) 59. Header 60 typically comprises two bytes for frame control 51, two bytes for the duration ID 52, six bytes for source address 53, six bytes for destination address 54, six bytes for receiver address 55, two bytes for sequence control 56, and six bytes for transmitter address 57. Typically in a Wi-Fi network, data 58 comprises packets that conform to the Internet Protocol (IP), which comprise up to an additional 20 bytes of header.

Figure 5:
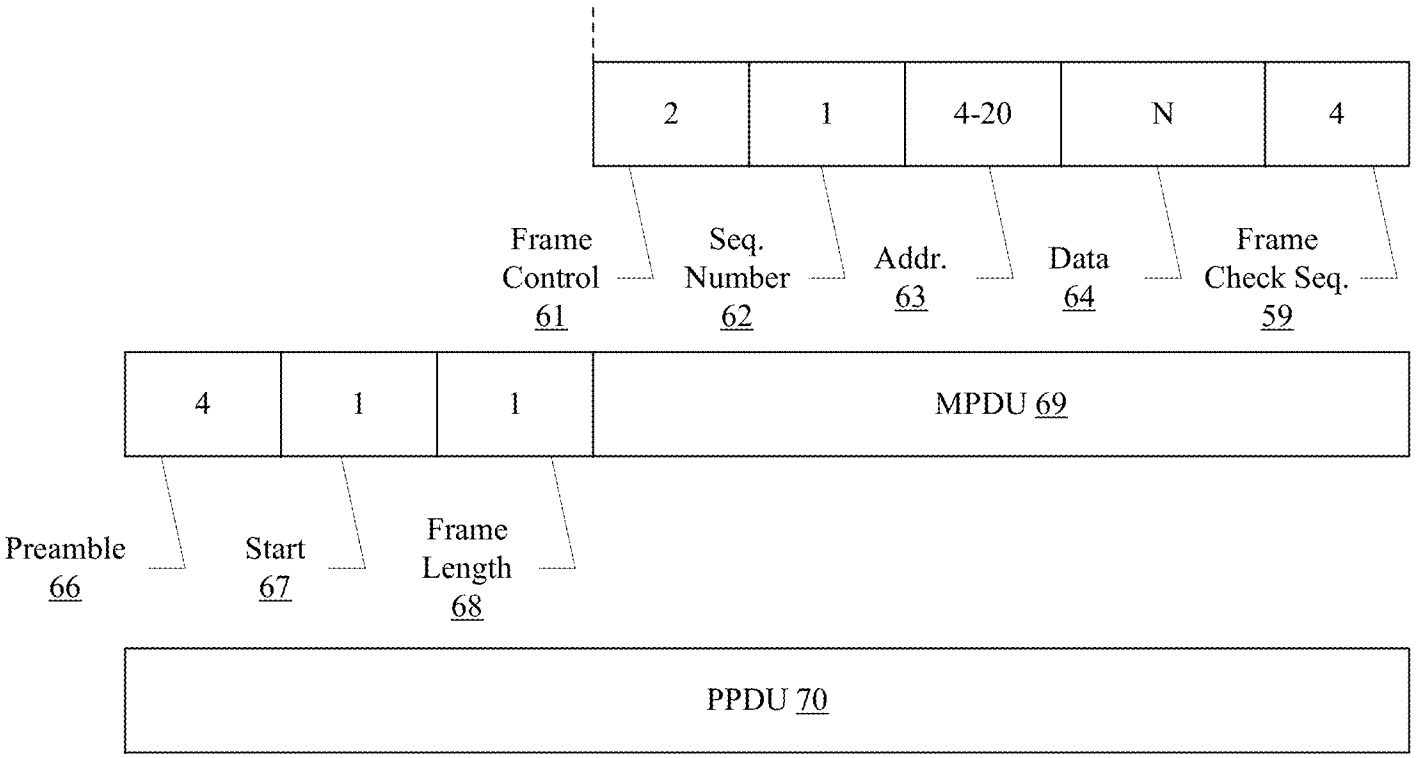
FIG. 5 is an exemplary diagram for a packet communicated through free space using visible light.

FIG. 5 illustrates a possible data frame format, which is generally compatible with the ZigBee wireless RF protocol, for communicating with visible light. The data frame format shown in FIG. 5 comprises a Physical Protocol Data Unit (PPDU) 70, which further comprises four bytes for preamble sequence 66, one byte for start of frame delimiter 67, one byte for frame length 68, and up to 128 bytes for Mac Protocol Data Unit (MPDU) 69. MPDU 69 comprises two bytes for frame control 61, one byte for data sequence number 62, four to twenty bytes for address information 63, N bytes for data 64, and four bytes for Frame Check Sequence (FCS) 65.

In the example lamp 40 illustrated in FIG. 3, Wi-Fi interface 43 can forward received data frames conforming to the example Wi-Fi protocol illustrated in FIG. 4 to processor 42. Processor 42 interprets such data frames and creates data frames conforming to the example visible light communication protocol illustrated in FIG. 5. Processor 42 inputs such data frames to VLC network controller 34 for transmission through PLI 35 and LEDs 36. Likewise, data frames input to VLC network controller 34 through LEDs 36 and PLI 35 can be processed and transmitted through PLI 35 and LEDs 36 or forwarded to processor 42, which can interpret such data frames, create data frames conforming to the example Wi-Fi protocol and forward such data frames to Wi-Fi interface 43 for transmission over such Wi-Fi network.

FIG. 3 is just one of many possible block diagrams for lamp 40. For instance, instead of the LEDs 36 shown in FIG. 3, the light source could be a fluorescent bulb or any other type of light source. Lamp 40 could also comprise a photodetector, such as a silicon photodiode, instead of using LEDs 36 as both the light source and light detector. Lamp 40 does not need to be synchronized to the AC mains and comprise timing block 33. Many other means of synchronization are possible and communication even without synchronization is possible. Lamp 40 could be battery or solar powered, for instance, and as such would have a different or no power supply 41. VLC network controller 34 and PLI 35 in this example implement the data frame format illustrated in FIG. 5, but could implement any type of communication protocol using visible light. For instance, the protocol described uses substantially the same frame format as ZigBee, however, any frame format including substantially simpler versions with smaller headers are possible.

Wi-Fi interface 43 is just one example of many different network interfaces using many different types of communication channels that are possible. It is also possible to have multiple interfaces to different networks. Some other network examples include X10, DMX512, DALI, Ethernet, ZigBee, HomePlug, LonWorks, C-Bus, Dynalite, Bluetooth, and even SONET and ATM. A typical configuration for lamp 22 in FIG. 1 could include a Wi-Fi interface 43 for communicating with a smart phone for instance for local control, and an Ethernet interface (not shown) for communicating with a building controller 11.

Figure 6:
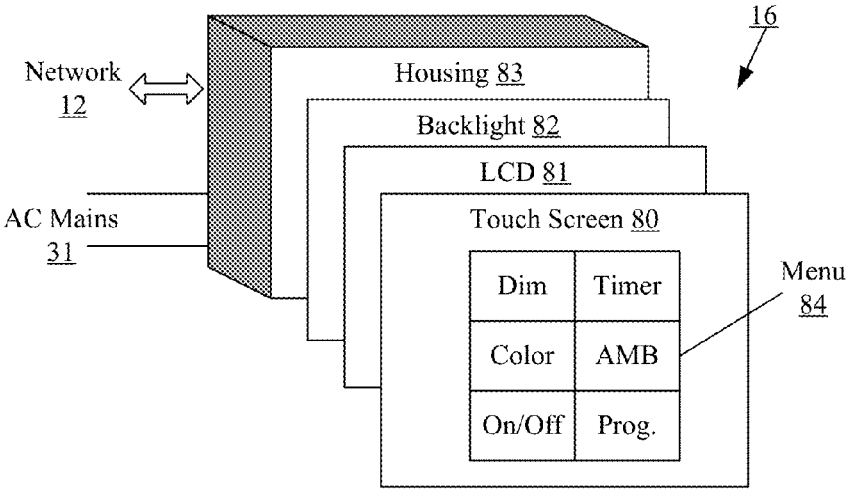
FIG. 6 is an exemplary drawing of an electronic device with an HMI, wherein the electronic device controls a lighting system by communicating with lamps through free space with visible light and communicating with a network and other controlling devices through Wi-Fi and Ethernet interfaces.

FIG. 6 illustrates one embodiment of the electronic device 16 from FIG. 1 that interfaces to network 12, wireless communication device 20, and lamps 17, 18 and 19. In this example FIG. 6, a user can also control lamps 17, 18, and 19 within room1 13, and potentially the entire lighting system 10, by pushing regions of touch screen 80 that overlay menu 84 that is an image produced by LCD 81 and illuminated by backlight 82. The example menu 84 provides various buttons to turn lights on and off (ON/OFF), adjust brightness (DIM), change color (COLOR), set the timer (TIMER), adjust the ambient light sensor (AMB), and access advanced programming functions (PROG). In this example FIG. 6, electronic device 16 is powered by the AC mains 31 and is contained within housing 83. The HMI in FIG. 6 is provided by the touch screen 80 and LCD 81.

Electronic device 16 communicates with building controller 11 through network 12 according to any one of many different data communication protocols over any of a variety communication channels including but not limited to CAT5 or twisted pair cable, RF wireless, powerline or fiber optics. Although it need not communicate with device 20, electronic device 16 can also optionally communicate with wireless communication device 20 (which could be a smart phone) using any one of many different RF, infrared, or other wireless communication protocols, including but not limited to Wi-Fi, ZigBee, Bluetooth, IRDA, or others. According to one embodiment of the invention, electronic device 16 communicates with lamps 17, 18, or 19 through free space using modulated visible light that also provides illumination for electronic device 16.

Figure 7:
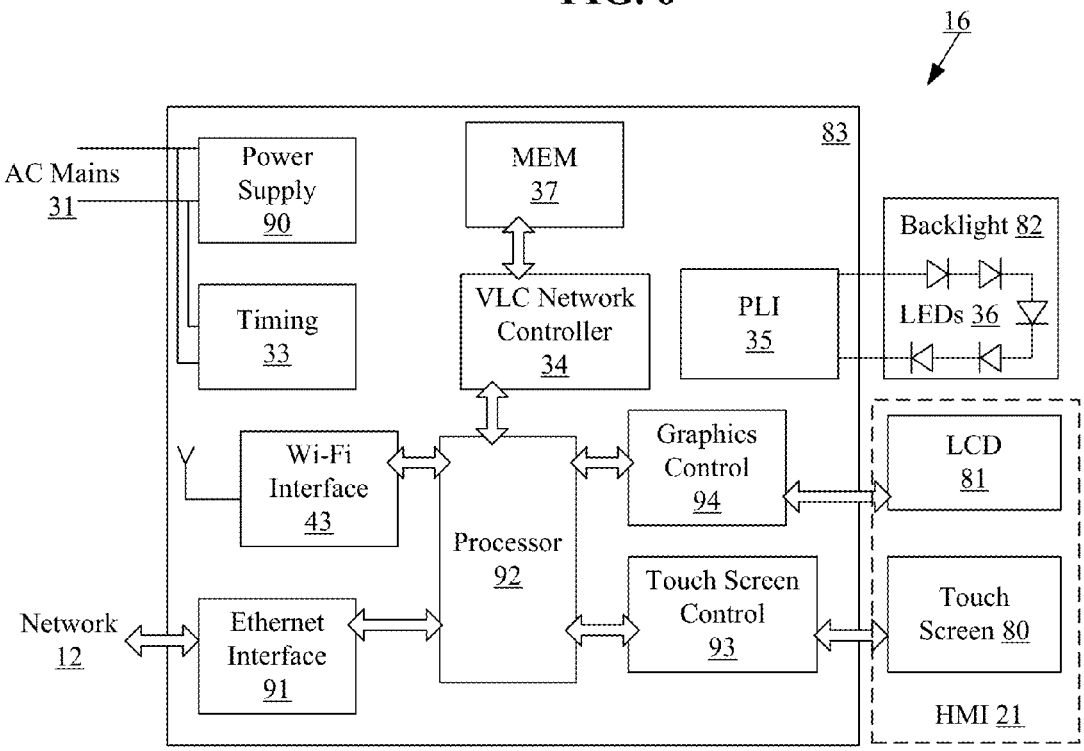
FIG. 7 is an exemplary block diagram of an electronic device with an HMI, wherein the electronic device controls a lighting system by communicating with lamps through free space with visible light and communicating with a network and other controlling devices through Wi-Fi and Ethernet interfaces.

FIG. 7 is an example functional block diagram of the electronic device 16 that comprises a touch screen 80, LCD 81, backlight 82, and housing 83, as shown in FIG. 6. Housing 83 can comprise the same timing 33, memory 37, VLC network controller 34, PLI 35 and Wi-Fi interface 43 as illustrated in FIG. 3, and can also comprise Ethernet interface 91, touch screen controller 93, graphic controller 94, and processor 92. LEDs 36 in the examples of FIG. 6 and FIG. 7 reside in backlight 82 and produce illumination for LCD 81, and transmit data through free space using visible light. Additionally, LEDs 36 (which in the example of FIG. 7 could be red LEDs) can also operate as light detectors for receiving data transmitted through free space using visible light.

In this example FIG. 7, electronic device 16 interfaces with building controller 11 according to the Ethernet protocol, which typically uses CAT5 cable as the communication channel. Messages received by Ethernet interface 91 can be forwarded to processor 92, which can implement the control circuitry necessary to interpret or translate such messages to commands that can be transmitted through free space using visible light with LEDs 36 as the light source. As in FIG. 3, messages received through Wi-Fi interface 43 can also be forwarded to processor 92 for interpretation and translation to commands that can be transmitted through free space using visible light with LEDs 36 as the light source.

In this example FIG. 7, commands transmitted optically through free space can also be received by LEDs 36 operating as light detectors, interpreted or translated by processor 92, and transmitted by Wi-Fi interface 43 back to wireless communication devices 20 or 25, or transmitted by Ethernet interface 91 to building controller 11. Likewise, processor 92 can route messages from any of Ethernet interface 91, Wi-Fi interface 43, and VLC network controller 34 to any other such network interface.

The protocol for communicating through free space using visible light can be the same as, or different from, the protocol described in one or more priority applications listed herein. In this example FIG. 7, LEDs 36 can be configured to continuously provide illumination and communicate for instance with lamps 17, 18, or 19, building controller 11, or wireless communication device 20 at any time. As another possibility, LEDs 36 could typically be turned off and electronic device 16 could be in a low power state until a user first touches touch screen 80, after which electronic device 16 powers up, illuminates LEDs 36, and enables communication.

FIG. 6 and FIG. 7 are just examples of many possible diagrams for an electronic device 16 comprising an HMI 21. Although FIGS. 6 and 7 illustrate the HMI 21 of the electronic device 16 as including a touch screen 80 and LCD 81, the HMI could have any one of many other possible mechanical forms that do not necessarily include touch screen 80 or LCD 81. For example, HMI 21 could comprise mechanical buttons that are illuminated from in front, behind, above, or below. As a further example, HMI 21 could comprise an Organic LED (OLED) display instead of an LCD. Backlight 82 can be any type of light source positioned in any manner to provide illumination for HMI 21, which may have a dedicated light detector (such as a silicon photodiode) or use LEDs 36 for both emitting and detecting light. If HMI 21 comprises an OLED or any other type of active matrix display, such light source could be such active matrix display. Likewise, an OLED display could be the detector as well.

Electronic device 16 could be battery or solar powered, or powered in any other way instead of being powered by AC mains 31. Electronic device 16 could be synchronized to lamps 17, 18, and 19 through any one of a number means, or not at all. Electronic device 16 could be a mobile computing device such as a smart phone, PDA, or netbook, notebook, or laptop computer, or a stationary computing device such as a desktop computer or even a television.

Menu 84 and the associated functionality described herein is just one possibility. Any number of different menus with totally different functionality is possible. If HMI 21 does not comprise some sort of display, then menu 84 may be replaced by pushbuttons for instance.

The block diagram for the electronic device 16 illustrated in FIG. 7 is just one of many possible examples. For instance, the light source could be a CCFL or even a CFL instead of the LEDs 36. The electronic device 16 could also comprise an additional photodetector. Memory 37 could be a part of processor 92. Other than the Wi-Fi and Ethernet interfaces illustrated, any type of network interface is possible to communicate with building controller 11, network 12, or wireless communication device 20. Any number of network interfaces is also possible, including none. For instance, a smart phone could communicate directly with lamps 17, 18, and 19 by modulating the backlight or the camera flash, and as such, would not need a Wi-Fi interface 43 or Ethernet interface 91. Ambient light sensors could be used to receive data transmitted optically.

Figure 8:
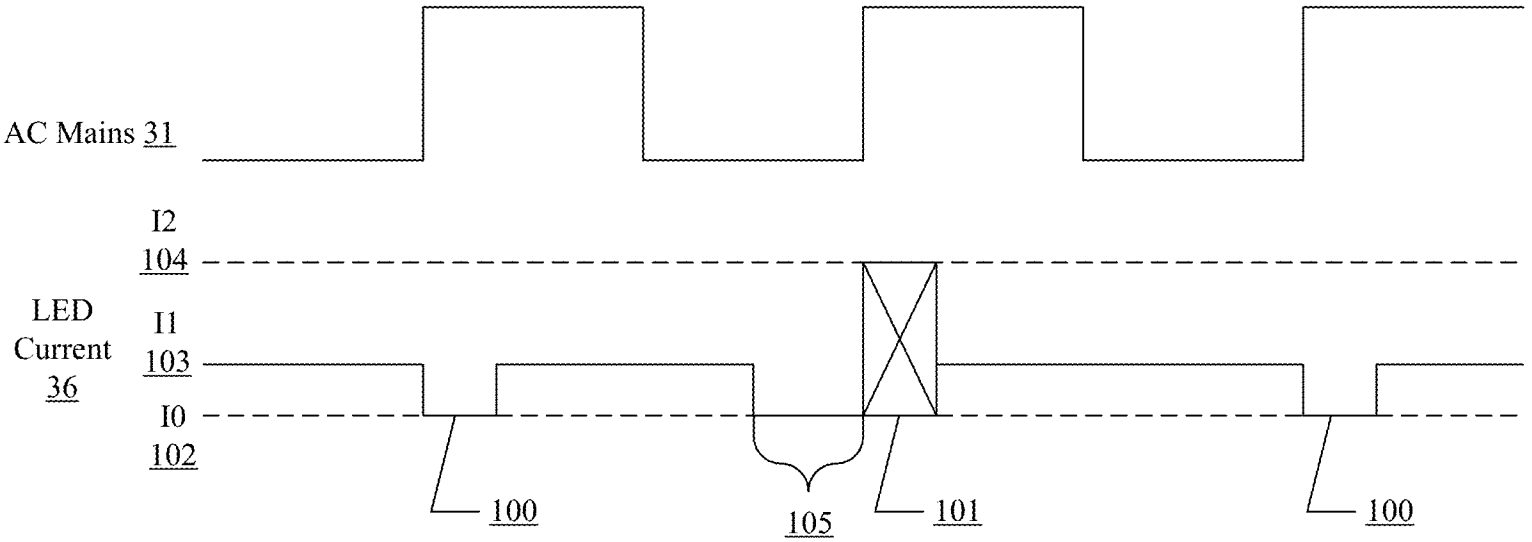
FIG. 8 is an exemplary timing diagram for communicating between an HMI and lamps through free space using visible light.

FIG. 8 is an example timing diagram for transmitting data optically from electronic device 16 in a way that minimizes or eliminates flicker. The current through LEDs 36 is typically I1 103, which should produce sufficient light to see menu 84. As described in one or more priority applications listed herein, the current supplied to the LEDs 36 is periodically reduced from I1 103 to I0 102 to produce communication gaps 100 and 101 in synchronization preferentially with the AC mains 31. As noted in the priority applications, the communication gaps are produced at regular, periodic intervals of each cycle of the AC mains, and the time duration of said communication gaps may be less than one quarter of each cycle of the AC mains. During gaps 100 when data is not being transmitted, the current through LEDs 36 is reduced to I0 102, which could be a low level close to or equal to zero. During gaps 101 when data is being transmitted, the current through LEDs 36 is modulated between I0 102 and 12 104, which is higher than I0 102, so that the LEDs 36 emit light at two different output levels. I2 104 is preferentially, but not necessarily, the highest current LEDs 36 can tolerate in order to produce the most light to communicate the maximum distance. Any data modulation technique is possible including but not limited to Non-Return to Zero (NRZ) and Bi-phase.

To minimize possible flicker produced by gaps 101 during which data is transmitted at high brightness, during time 105 preceding gap 101, as shown in FIG. 8, or after gap 101 (not shown), the current through LEDs 36 is reduced from I1 103 to I0 102, such that the average brightness of light produced by LEDs 36 is the same whether or not data is transmitted during the gap times.

FIG. 8 is just one of many possible examples of a timing diagram for transmitting data optically from electronic device 16. For instance, communication gaps could occur at a faster or slower rate than the AC mains 31, at rates totally unrelated to the AC mains 31, or not at all. As an example, a video could be played on a smart phone that modulates the backlight or the light from an active display, such as an OLED, with light and dark frames in the video. The light from the electronic device could also be allowed to flicker for instance and as such could have a significantly different timing diagram from FIG. 8.

While the invention is susceptible to various modifications and alternative forms, specific embodiments thereof are shown and described by way of example. It should be understood, however, that the drawings and detailed description thereto are not intended to limit the invention to the particular form disclosed.

The invention claimed is:

1. An electronic device coupled to AC mains for controlling a lighting system, the electronic device comprising:

a light source configured to provide illumination and to transmit data optically through free space using visible light;

a light detector configured to receive data transmitted optically through free space using visible light;

a human machine interface (HMI) configured to receive input from a user;

a network interface configured to receive data from a network; and control circuitry configured to produce commands in synchronization with a frequency of the AC mains for controlling the lighting system in response to the input received from the user through the HMI, the data received by the light detector, and the data received through the network interface, and to transmit said commands to the lighting system using the light source.

2. The electronic device as recited in claim 1, wherein the light source is one or more LEDs.

3. The electronic device as recited claim 2, wherein the light detector is one or more of the LEDs used as the light source.

4. The electronic device as recited in claim 1, wherein the HMI comprises at least one of a display screen and a set of buttons, and wherein the light source illuminates the at least one of the display screen and the set of buttons of the HMI.

5. The electronic device as recited in claim 1, further comprising a wireless communication device, configured to modulate light from a camera flash or a display of the wireless communication device.

6. The electronic device as recited in claim 5, wherein light from the display is modulated with alternating light and dark frames of a video to produce light modulated with the data.

7. The electronic device as recited in claim 1, wherein the network interface is connected to a cable over which data is communicated, and wherein the cable communicates data according to a protocol selected from a group consisting of DALI and Ethernet.

8. The electronic device as recited in claim 1, wherein the network interface communicates data using radio waves, and wherein the radio waves communicate data according to a protocol selected from a group consisting of Zigbee, IEEE802.11, and Bluetooth.

9. The electronic device as recited in claim 1, wherein the data received by the light detector and the data transmitted by the light source are communicated using a visible light communication (VLC) network controller of the electronic device.

10. A lamp coupled to AC mains in a lighting system, the lamp comprising:

a light source configured to provide illumination and to transmit data optically through free space using visible light, wherein the data is transmitted during periodic gaps in illumination in synchronization with a frequency of the AC mains;

a light detector configured to receive data transmitted optically through free space using visible light;

a network interface configured to receive data from a network; and control circuitry configured to produce commands for controlling the lighting system in response to the data received by the light detector and the data received through the network interface, and to transmit said commands to the lighting system using the light source.

11. The lamp as recited in claim 10, wherein the control circuitry is configured to retransmit the same command through the light source that is received by the light detector to enable commands to be communicated to other lamps in the lighting system.

12. The lamp as recited in claim 10, wherein the network interface is connected to a cable over which data is communicated, and wherein the cable communicates data according to a protocol selected from a group consisting of DALI and Ethernet.

13. The lamp as recited in claim 10, wherein the network interface communicates data using radio waves, and wherein the radio waves communicate data according to a protocol selected from a group consisting of Zigbee, IEEE802.11, and Bluetooth.

14. A lighting system comprising:

an LED configured to both illuminate and to transmit and receive commands optically through free space using visible light;

a building controller configured to control the lighting system; and an electronic device configured to control the lighting system, the electronic device comprising:

a human machine interface (HMI) configured to receive input from a user; and a network interface configured to receive commands from the building controller;

wherein the electronic device is configured to produce commands in response to the user input to the HMI, and to forward at least one of said commands to the [light source] *LED* optically through free space using visible light.

15. The lighting system as recited in claim 14, wherein the building controller communicates with the electronic device over copper wire or an RF communication channel.

16. The lighting system as recited in claim 14, wherein the LED and the electronic device communicate in synchronization with each other.

17. The lighting system as recited in claim 16, wherein the LED and the electronic device are coupled to an AC mains and communicate in synchronization with a frequency or phase of the AC mains.

18. The lighting system as recited in claim 14, wherein the building controller communicates with the electronic device using the DALI protocol.

19. The lighting system as recited in claim 14, wherein the building controller communicates with the electronic device using Ethernet.

20. The lighting system as recited in claim 14, wherein the building controller communicates with the electronic device using Zigbee, IEEE 802.11, or Bluetooth.

21. The lighting system as recited in claim 14, wherein the electronic device enables the user to control the lighting system independent of and/or overriding the commands from the building controller.

22. The lighting system as recited in claim 14, wherein the electronic device comprises:

a light source configured for illuminating the HMI and for transmitting the at least one of said commands to the light source optically through free space using visible light; and a light detector configured for receiving data from the [light source] *LED* of the lighting system.

23. The lighting system as recited in claim 22, wherein the HMI comprises a touch screen or a set of buttons that are illuminated by the light source, wherein the touch screen or the set of buttons are configured for displaying information about the lighting system or for receiving the input from the user.

24. A method to transmit data from a visible light source coupled to an AC mains, the method comprising:

supplying current to the visible light source at a first level sufficient to produce light;

periodically reducing the current supplied to the visible light source to produce communication gaps at regular, periodic intervals of each cycle of the AC mains, wherein the current is reduced from the first level to a second level less than the first level;

transmitting data solely within a subset of said communication gaps by modulating the current supplied to the visible light source between the second level and a third level, which is higher than the first level; and immediately preceding each of the subset of said communications gaps, reducing the current supplied to the visible light source to the second level for a period of time, such that an average brightness of light produced by the visible light source is the same whether or not data is transmitted during said communication gaps.

25. The method as recited in claim 24, wherein the step of transmitting data comprises modulating the current supplied to the visible light source within each of the subset of said communication gaps, so that the visible light source emits light at two different output light levels.

26. The method as recited in claim 24, further comprising restricting [the] *a* time duration of said communication gaps to be less than one quarter of each cycle of said AC mains.

*27. A lamp configured to be coupled to AC mains, the lamp comprising:*

*a light source configured to provide illumination and to transmit data optically using visible light, wherein the data is transmitted during periodic gaps in illumination in synchronization with a frequency of the AC mains;*

*a network interface configured to receive data from a network; and*

*control circuitry configured to produce commands for controlling at least one other lamp in response to the data received through the network interface, and to transmit the commands to the at least one other lamp using the light source.*

*28. The lamp as recited in claim 27, further comprising:*

*a light detector configured to receive data transmitted optically using visible light; and*

*wherein the control circuitry is further configured to receive a command received by the light detector, and retransmit the same command as received by the light detector through the light source.*

*29. The lamp as recited in claim 27, wherein the network interface is configured to be connected to a cable over which data is communicated.*

*30. The lamp as recited in claim 29, wherein the network interface is configured to communicate data over the cable according to a protocol that comprises DALI or Ethernet.*

*31. The lamp as recited in claim 27, wherein the network interface is configured to communicate data using radio waves.*

*32. The lamp as recited in claim 31, wherein the network interface is configured to communicate data via the radio waves according to a protocol that comprises Zigbee, IEEE802.11, or Bluetooth.*

*33. The lamp as recited in claim 27, wherein the control circuitry is further configured to receive a command through the network interface, and retransmit the same command as received through the network interface through the light source.*

*34. A controller, comprising:*

*physical layer interface (PLI) circuitry to provide power to one or more operatively coupled light emitting diode (LED) strings;*

*visible light communication (VLC) circuitry operatively coupled to the PLI circuitry, the VLC circuitry to cause the one or more LED strings to communicate via visible light communication with at least one external device by selectively altering an illumination output level of the LED strings, the VLC circuitry configured to:*

*cause the PLI circuitry to periodically cycle, in synchronization with an AC main supply, the power supplied to the one or more LED strings between a first interval in which the one or more LED strings provide a first illumination output level and a second interval in which the one or more LED strings provide a second illumination output level less than the first illumination output level, the second interval to provide periodic gaps in illumination produced by the one or more LED strings; and*

*cause the PLI circuitry to sequentially, selectively provide power to at least a portion of the one or more LED strings sufficient to cause the portion of the one or more LED strings to provide a third illumination output level greater than the first illumination output level during at least a portion of the second interval to transmit a visible light communication.*

*35. The controller of claim 34, further comprising:*

*timing circuitry operatively coupled to the VLC circuitry and to the PLI circuitry, the timing circuitry to synchronize the PLI circuitry and the VLC circuitry with a frequency of the AC main supply.*

*36. The controller of claim 35, wherein the timing circuitry includes phase-locked loop (PLL) circuitry.*

*37. The controller of claim 34, further comprising:*

*one or more photodetectors operatively coupled to the VLC circuitry.*

*38. The controller of claim 37, the VLC circuitry configured to further:*

*receive, via the one or more photodetectors during the second interval, a visible light communication from a remote device, the visible light communication using one or more LED strings included in the remote device,*

*wherein the visible light communication includes a binary sequence created by a sequential, selective provision of power, synchronized with the AC main supply, to at least a portion of the one or more LED strings in the remote device sufficient to cause the portion of the one*

*or more LED strings in the remote device to provide the third illumination output level.*

*39. The controller of claim 34, wherein transmission of the visible light communication comprises transmission of an instruction via a visible light binary sequence created by causing the portion of the one or more LED strings to generate a sequential output that includes the third illumination output level and the second illumination output level during at least a portion of one or more second intervals.*

*40. The controller of claim 39, further comprising:*

*memory circuitry operatively coupled to the VLC circuitry.*

*41. The controller of claim 40, wherein the instruction comprises an instruction retrieved by the VLC circuitry from the memory circuitry.*

*42. The controller of claim 38, further comprising:*

*wireless radio frequency (RF) transceiver circuitry operatively coupled to the VLC circuitry.*

*43. The controller of claim 42, wherein the VLC circuitry configured to further:*

*translate an instruction received via the wireless RF transceiver circuitry and stored in memory circuitry to provide the visible light communication.*

*44. A method of transmitting a visible light communication, the method comprising:*

*cycling physical layer interface (PLI) circuitry in synchronization with an AC main supply, to periodically supply power to one or more LED strings such that during a first interval the one or more LED strings provide a first illumination output level and during a second interval the one or more LED strings provide a second illumination output level less than the first illumination output level, the second interval to provide periodic gaps in illumination produced by the one or more LED strings; and*

*causing the PLI circuitry to sequentially, selectively provide power to at least a portion of the one or more LED strings sufficient to cause the portion of the one or more LED strings to provide a third illumination output level greater than the first illumination output level during at least a portion of the second interval to transmit a visible light communication.*

*45. The method of claim 44, further comprising:*

*synchronizing, by timing circuitry operatively coupled to the PLI circuitry, the frequency of the AC main supply with cycling the power supplied to the one or more LED strings during the first interval.*

*46. The method of claim 45, wherein synchronizing the frequency of the AC main supply with cycling the power supplied to the one or more LED strings during the first interval further comprises:*

*synchronizing, by phase-lock loop (PLL) circuitry coupled to the PLI circuitry, the frequency of the AC main supply with cycling the power supplied to the one or more LED strings during the first interval.*

*47. The method of claim 45, further comprising:*

*receiving, via one or more photodetectors during the second interval, a visible light communication from a remote device, the visible light communication using one or more LED strings included in the remote device,*

*wherein the visible light communication includes a binary sequence created by a sequential, selective provision of power, synchronized with the AC main supply, to at least a portion of the one or more LED strings in the remote device sufficient to cause the portion of the one or more LED strings in the remote device to provide the third illumination output level.*

*48. The method of claim 44, wherein sequentially, selectively providing power to at least the portion of the one or more LED strings sufficient to cause the portion of the one or more LED strings to provide the third illumination output level greater than the first illumination output level during at least the portion of the second interval further comprises:*

*causing the PLI circuitry to sequentially, selectively provide power to at least the portion of the one or more LED strings sufficient to cause the portion of the one or more LED strings to provide the third illumination output level greater than the first illumination output level during at least the portion of the second interval to transmit an instruction to an external device via a visible light binary sequence.*

*49. The method of claim 45, further comprising:*

*retrieving the instruction from memory circuitry.*

*50. The method of claim 49, further comprising:*

*translating an instruction received via wireless RF circuitry to provide the visible light binary sequence.*

* * * * *